US012663004B2

(12) United States Patent
    Samid

(10) Patent No.: US 12,663,004 B2
(45) Date of Patent: Jun. 23, 2026

(54) MULTI-MODE PISTON: A CHEMICAL ENGINEERING BUILDING BLOCK

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 18/787,413

(22) Filed: Jul. 29, 2024

(65) Prior Publication Data

US 2026/0028983 A1    Jan. 29, 2026

(51) Int. Cl.
    *B01D 17/00* (2006.01)
    *B01F 23/40* (2022.01)
    *F04B 49/06* (2006.01)
    *F04B 53/14* (2006.01)

(52) U.S. Cl.
    CPC ............ *F04B 53/148* (2013.01); *B01D 17/00* (2013.01); *B01F 23/49* (2022.01); *F04B 49/065* (2013.01)

(58) Field of Classification Search
    CPC ...... F04B 53/148; F04B 7/007; F04B 7/0023; F04B 7/046; F04B 53/12; F04B 53/121; F04B 53/127; F04B 53/128; F04B 53/14; F04B 49/00; F04B 49/065; F04B 2201/06; F04B 2201/0601; B01D 17/00; B01F 23/49; B01F 29/86; B01F 35/221422; B01F 35/2216; B01F 35/22161; B01F 35/7547; B01F 35/75471; F16K 3/08; F16K 3/085
    See application file for complete search history.

(56) References Cited

U.S. PATENT DOCUMENTS

| | | | | |
|---|---|---|---|---|
| 593,333 | A * | 11/1897 | Park ................... | B01L 3/50215 |
| | | | | 222/386 |
| 2,420,616 | A * | 5/1947 | Palmer .................... | A23D 7/02 |
| | | | | 366/276 |
| 3,140,078 | A * | 7/1964 | Grubb ................ | B01F 35/7161 |
| | | | | 222/386 |
| 4,941,808 | A * | 7/1990 | Qureshi ................... | F04B 3/00 |
| | | | | 417/415 |
| 5,198,197 | A * | 3/1993 | Clay ........................ | G01N 1/40 |
| | | | | 422/256 |
| 5,457,626 | A * | 10/1995 | Wolze ................. | G05D 7/0682 |
| | | | | 700/32 |
| 11,745,153 | B2 * | 9/2023 | Samid .................... | B01D 15/18 |
| | | | | 366/177.1 |
| 12,052,340 | B2 * | 7/2024 | Samid .................... | B01F 31/40 |

(Continued)

FOREIGN PATENT DOCUMENTS

DE      2825230 A1 *  12/1979  .......... B01F 11/0082

OTHER PUBLICATIONS

English translation of Patent Publication DE2825230A1, published Dec. 20, 1979. (Year: 1979).*

(Continued)

*Primary Examiner* — Joseph W Drodge

(57) ABSTRACT

Proposing a versatile apparatus that can be adapted to carry out most fluid handling operations practiced in industrial chemistry. It comprises a capsule in which a piston is moving from side to side while rotating; the piston having a set of holes to control fluid passage through a proper dynamics for opening and closing these holes. Used for in pipe pumping, pipe-reactors and pipe-separators, serving as a "Lego-like" building block to represent a large variety of full-fledged chemical processes.

12 Claims, 22 Drawing Sheets

Bluetooth Controlled "Lego" Construction

(56) References Cited

U.S. PATENT DOCUMENTS

| | | | |
|---|---|---|---|
| 2005/0006410 A1* | 1/2005 | Bach ..................... | B01L 3/0206 |
| | | | 222/309 |
| 2005/0194407 A1* | 9/2005 | Bach ..................... | B01L 3/0206 |
| | | | 222/309 |
| 2006/0191580 A1* | 8/2006 | Sponheimer ............ | F16K 3/085 |
| | | | 137/625.31 |
| 2008/0104208 A1* | 5/2008 | Ebrom ................ | H04L 12/2827 |
| | | | 714/E11.202 |
| 2008/0104212 A1* | 5/2008 | Ebrom ................... | G06Q 10/06 |
| | | | 714/E11.202 |
| 2008/0105134 A1* | 5/2008 | Elston, III ............ | G06Q 10/06 |
| | | | 99/325 |
| 2016/0218884 A1* | 7/2016 | Ebrom ................ | H04L 12/2816 |

OTHER PUBLICATIONS

Escapenet translation of Patent Publication DE2825230A1, published Dec. 20, 1979 (Year: 1979).*

* cited by examiner

Fig-1
Fig-2
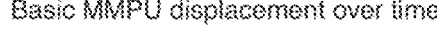
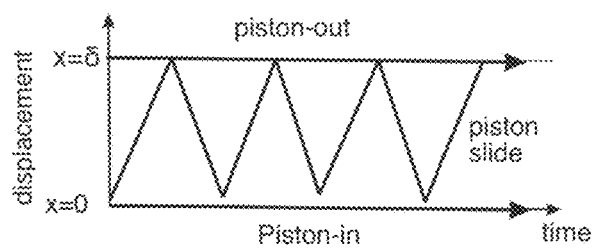
Basic MMPU displacement over time
| MMPUb open/closed states of Pistons | | | |
|---|---|---|---|
| | Pin | Slider | Pout |
| loading | 0 | X | 0 |
| Payload | X | 0 | X |
| Discharge | 0 | X | 0 |
Fig-3
| Quantum Fluid Dynamics | | | | | |
|---|---|---|---|---|---|
| time | Upstream | Loading | Payload | Discharge | Downstream |
| Δt | 1 | | | | |
| Δt | 2 | 1 | | | |
| Δt | 2 | | 1 | | |
| Δt | 2 | | 1 | | |
| Δt | 2 | | 1 | | |
| Δt | 3 | 2 | | 1 | |
| Δt | 3 | | 2 | | 1 |
| Δt | 3 | | 2 | | |
| Δt | 3 | | 2 | | |
| Δt | 4 | 3 | | 2 | |
| Δt | 4 | | 3 | | 2 |
| Δt | 4 | | 3 | | |
| Δt | 4 | | 3 | | |
| Δt | | 4 | | 3 | |
| Δt | | | 4 | | 3 |
Fig-4
C-Integrated Basic MMP Units
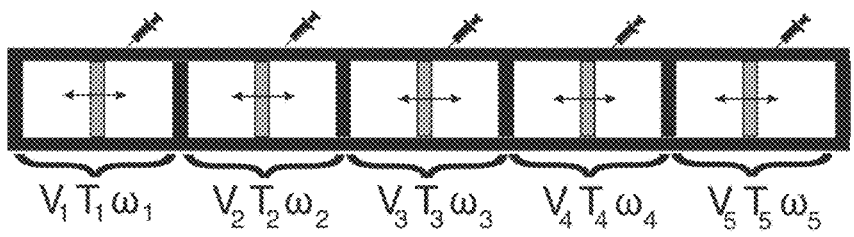

Fig-7
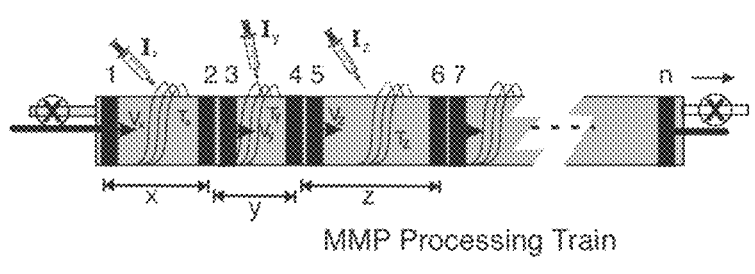
MMP Processing Train
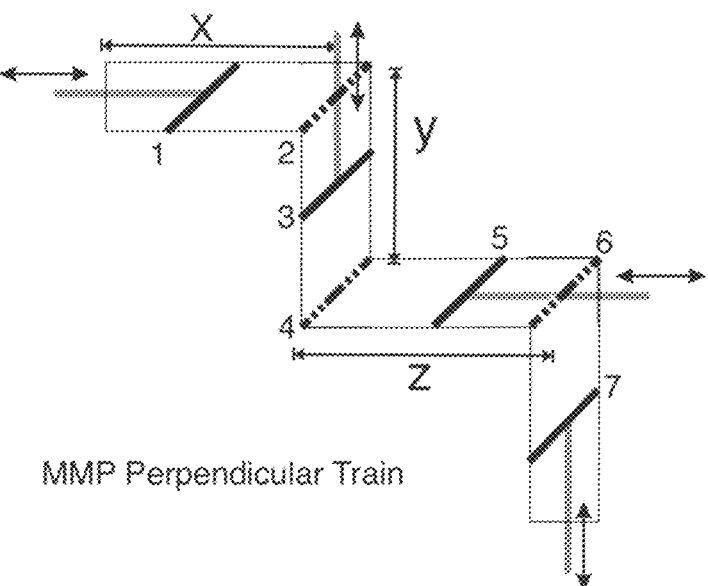
MMP Perpendicular Train $$V = \frac{x \cdot d_x^2 \cdot \Pi}{4} = \frac{y \cdot d_y^2 \cdot \Pi}{4}$$

MMP-Train with varied diameter sections

Split Concatenation
Configuration

Colliding Jets

PMH in a Non-Atmospheric Pressure Environment

Serial Configuration
of two PMH units

Fig-14
Cintegrator Options
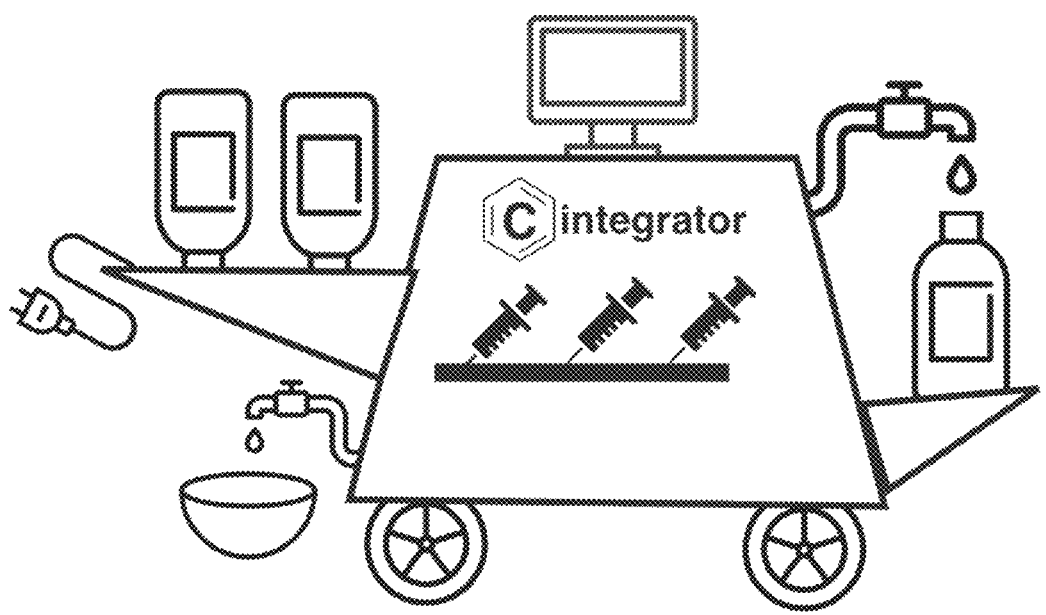
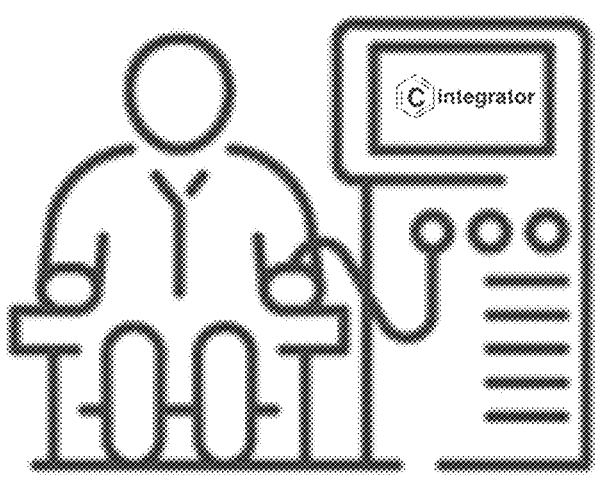

Divided/Combined Quantum Configuration

Compact Integrated MMP

"Colon" Style MMPU Line Sequence

MMPU-Knee

Hooking Up Two Basic MMP Units

Internal Battery Empowered Multi Mode Piston
Lateral Movement

Internally Powered multi mode piston
Lateral, Rotational, Openning Control

MMPU as a "Lego" Building Block

Bluetooth Controlled "Lego" Construction

Fig.-28
Fully Close/Open Disc Setup
Full Close State
Full Open State (minus a small angle)
Fig.-29
Six Pack Mutually Rotating Discs Piston
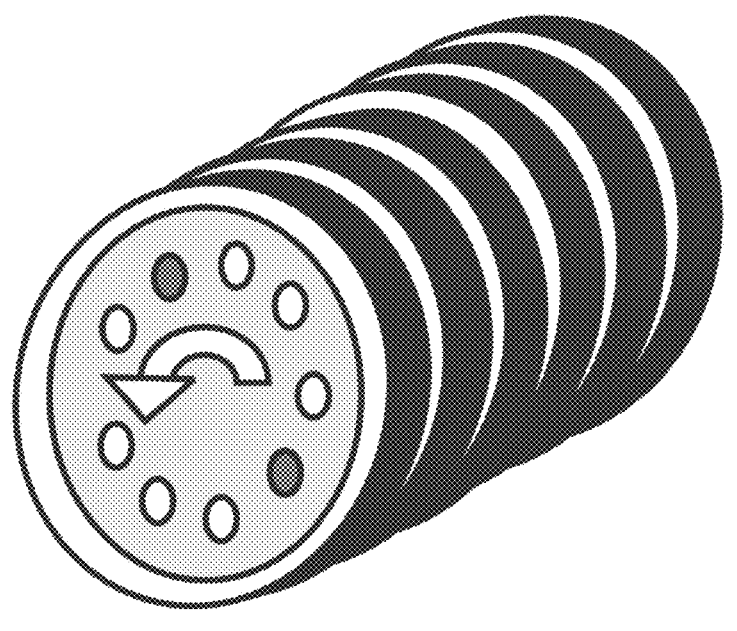

Fig-30
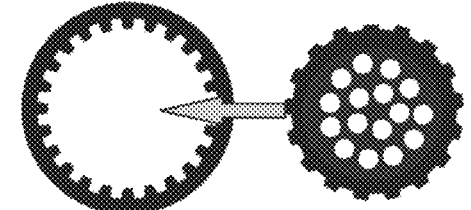
Rotating Piston - Cogwheel Basis
Fig-31
In-Pipe Pump
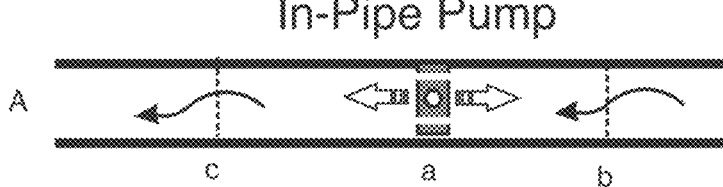
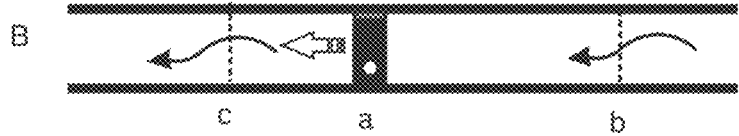
Fig.-32
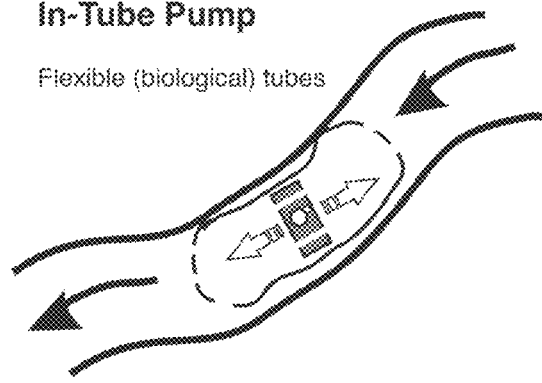
In-Tube Pump
Flexible (biological) tubes Fig-33
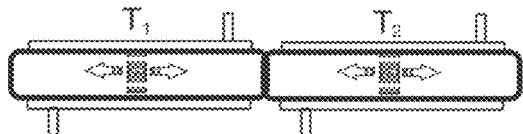
Tailored Heat Exchangers
Fig-34
Separation Configuration
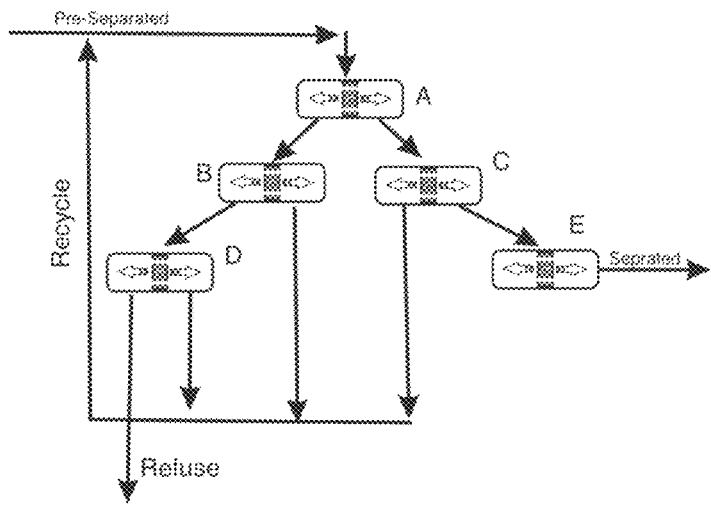
Fif.-35
Rotational Disc inside a non-circular Piston
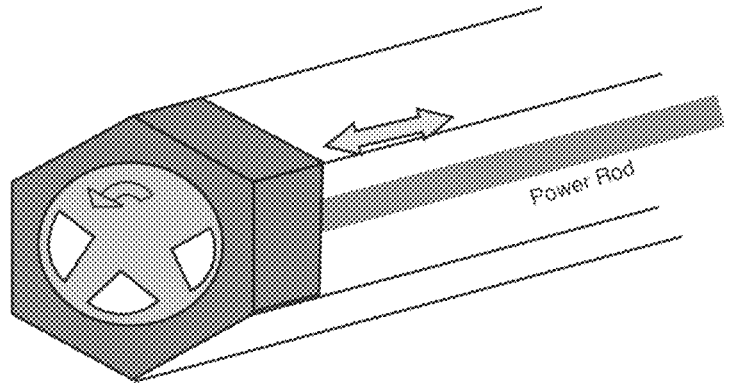

Electro Magnetic Rotation

Classic Chemical Engineering v. Multi Mode Piston Modular Construction

Material Exchange Between two Non-Mutually Dissolving Liquids

(1)          (2)          (3)          (4)

MULTI-MODE PISTON: A CHEMICAL ENGINEERING BUILDING BLOCK

This application is also a continuation in part of U.S. patent application Ser. No. 17/504,486. filed 2021 Oct. 18, and also a continuation in part of U.S. patent application Ser. No. 17/063,523 filed Oct. 5, 2020. This application is also a continuation in part of U.S. patent application Ser. No. 15/997,662 filed Jun. 4, 2018.

CROSS REFERENCE TO RELATED PROVISIONAL APPLICATIONS (CLAIMED BY THE CONTINUED APPLICATIONS)

Provisional Application 62/580,111 filed Nov. 1, 2017 Referenced in the continued application Ser. No. 15/997, 662, and Provisional Application 63/034,401 filed Jun. 4, 2020, Provisional Application 63/051,652 filed Jul. 14, 2020, Provisional Application 63/005,062 filed Apr. 3, 2020, Provisional Application 62/963,855, filed Jan. 21, 2020, Provisional Application 62/931,807 filed Nov. 7, 2019, Provisional Application 62/926,560 filed Oct. 27, 2019, Provisional Application 63/140,006, filed Jan. 21, 2021.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

The continued application Ser. No. 17/504,486 introduced the concept of quantum fluid operation where instead of continuous chemical processing, a sequence of well-defined quanta of fluid are being treated one by one. This application builds on the continued application and presents a fuller, more far-reaching possibilities based on the notion of fluid quanta.

BRIEF SUMMARY OF THE INVENTION

Using a rotating piston with controllable fluid passage-ways (multi mode piston, MMP) fitted in a capsule to form an MMP unit, MMPU, as building block to be assembled into an MMP network, MMPN, for carrying out fluid operations: pumping, mixing, reacting, separating, on various scales; replacing the common continuous operation with successive batch processing of quanta of fluids captured in an MMPU, powered either through (i) external rods and levers, (ii) external electrical motors, or (iii) internal rechargeable batteries. The MMP network of chemical engineering unit operations may be built in a very compact mode, is set for optimization by artificial intelligence, and is designed to be operated by unskilled operators. The "Lego like" design of the full scale chemical process is enabling disassembly and re-assembly of same equipment. The sound principle of the multi-mode piston extends its applicability to micro dimensions on one end, and large industrial scales on the other end. This invention describes (i) the multi-mode piston itself, (ii) the multi mode piston within a capsule that captures a quantum of fluid, and (iii) multi mode piston units linked to carry out start-to-finish chemical operation. The underlying innovative idea is that the multi-mode piston unit is versatile enough to be tailored to the full range of fluid handling processing, and hence it can serve as a building block to a large variety of processes, and also the different states of the MMPU are readily digitized, inviting AI tools to practice live updateable optimization of the carried out processes.

BRIEF DESCRIPTION OF THE DRAWINGS

FIG. 1. Basic MMPU Displacement Over Time

The essential "payload motion" of the MMPU is the repeat movement along a $\delta$ stretch, in order to achieve a process goal. This figure shows the displacement of the piston along a $\delta$ stretch over time. The capsule edge—the two stationary pistons piston-in and piston-out are stationary over time.

FIG. 2 MMPUb open/closed States of Piston

This figures shows the two stationary pistons (edges of the capsule) and the moving pistons per their states "0" open and "X" closed relative to the three phases of the MMPU basic operation: loading, payload, and discharge. In loading the stationary pistons are open and the moving piston is closed, same on discharge—the opposite on payload.

FIG. 3 Quantum Fluid Dynamics

This figure shows the status of 4 consecutive. quantum fluids as they move from the upstream to loading into payload mode, then to discharge and to downstream. As seen at the same time interval when one quantum fluid is moving out and next is moving in.

FIG. 4 C-Integrated Basic MMP Units

This figure shows a linear sequence of integration of MMPU, each is fitted with an injection option of a certain additive. Each MMP unit i has its own volume. $V_i$, the captured quantum is spending a time $T_i$ inside the unit, and the moving piston is making $w_i$ rounds over each quantum. Every unit i may also have a waiting $Tw_i$ so that $V_i/(T_i+Tw_i)$ is the same for all unit i=1, 2, . . . . Because the waiting times are a full degree of freedom, it is always possible to ensure the condition above.

Figure 5:
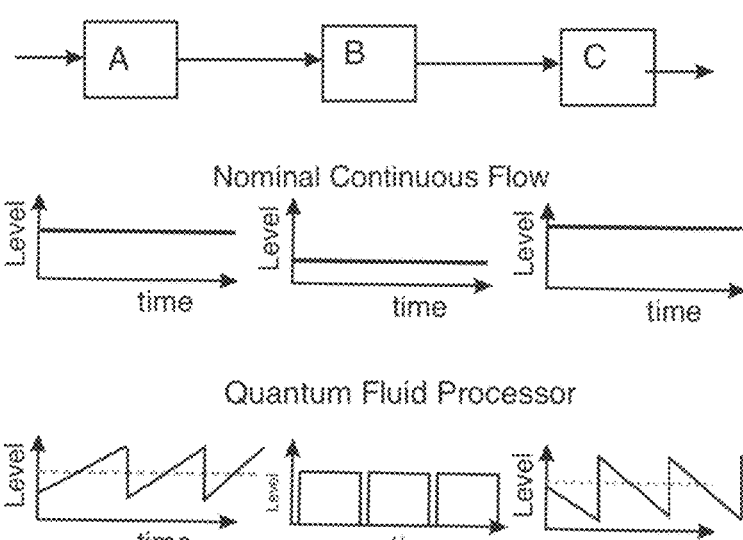

FIG. 5. Quantum Processing v. Nominal Processing

This figure shows the difference between nominal con-tinuous processing where all the parameters are fixed over time, as shown with the fixed level of fluid in containers A B and C. Container A feeds into the MMPU B which discharges into container C. The levels of fluid in the capacitors A and C is fluctuating as quantum of fluids are pumped in and out, and the level in B is fixed over the processing time of each quantum.

Figure 6:
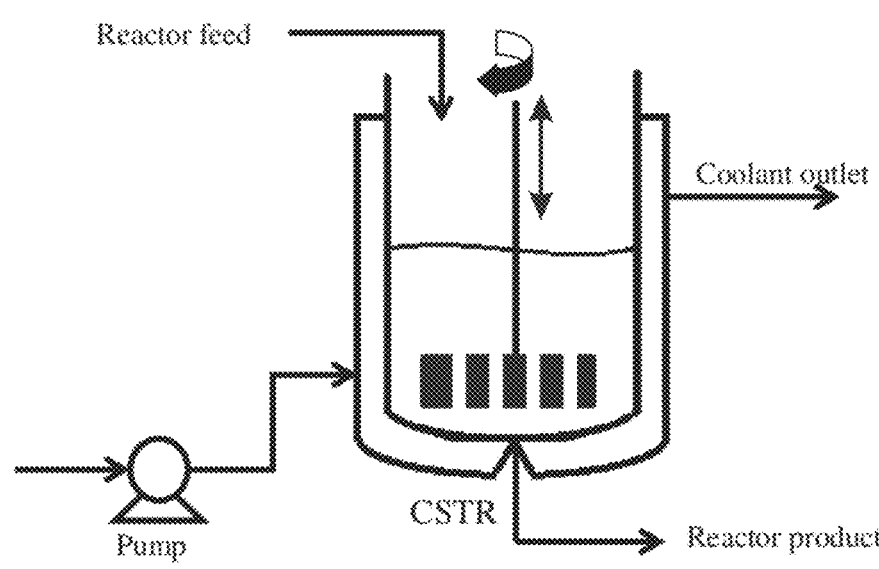

FIG. 6 MMP in an Open Tank

The figures shows the multi mode piston moving up and down, rotating and changing the open/closed states of its holes, as it operates in a nominal reactor, and replaces the standard mixer. This is an example for the seed element the MMP itself, not enclosed in a capsule.

FIG. 7 MMP Processing and Perpendicular Train

The top of the figure shows a sequence of MMPU where each has its own heat exchanger and its own injections. The bottom shows the same with a geometric change—the line of MMP units is taking two perpendicular turns to make it more compact or otherwise more comfortable. This is a special consideration for long sequences of MMPU, and for very large embodiment of the chemical integrator (C-Inte-grator).

Figure 8:
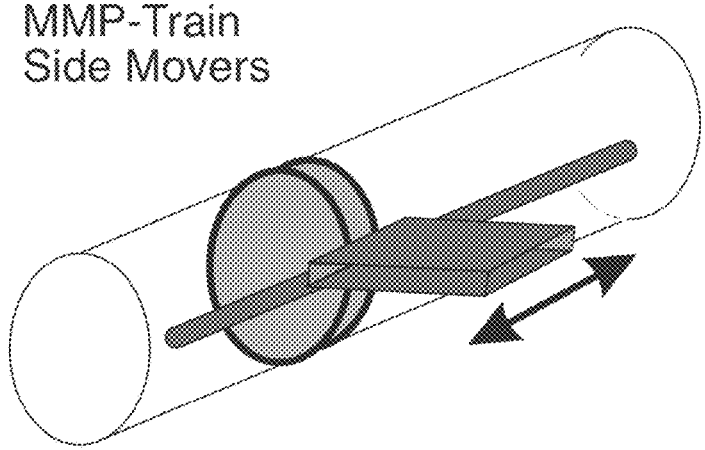

FIG. 8: MMP Train Side Movers

This figure shows how an MMP is moved back and forth through an external electro magnetic power sources. This movement may be contact based, which will require a split in the capsule and a risk of leakage, or it can be magnetic where no split is needed.

Figure 9:
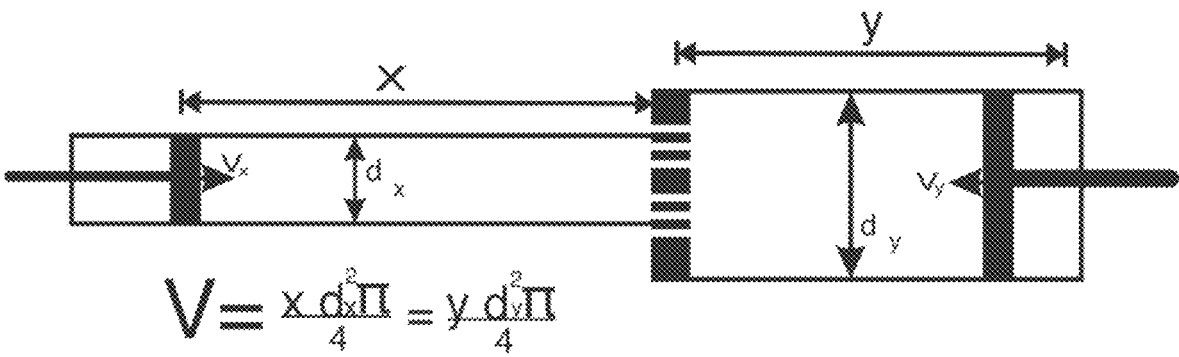

FIG. 9 MMP Train with varied diameter sections

This figure shows a linkage between two MMPU of different diameter, but with good bonding across their edges. The length of the small diameter capsule is longer so that the volume of the quantum of fluid housed by each capsule is the same, and when the quantum of fluid is moved from the narrow unit to the wider unit there is a perfect size fit.

Figure 10:
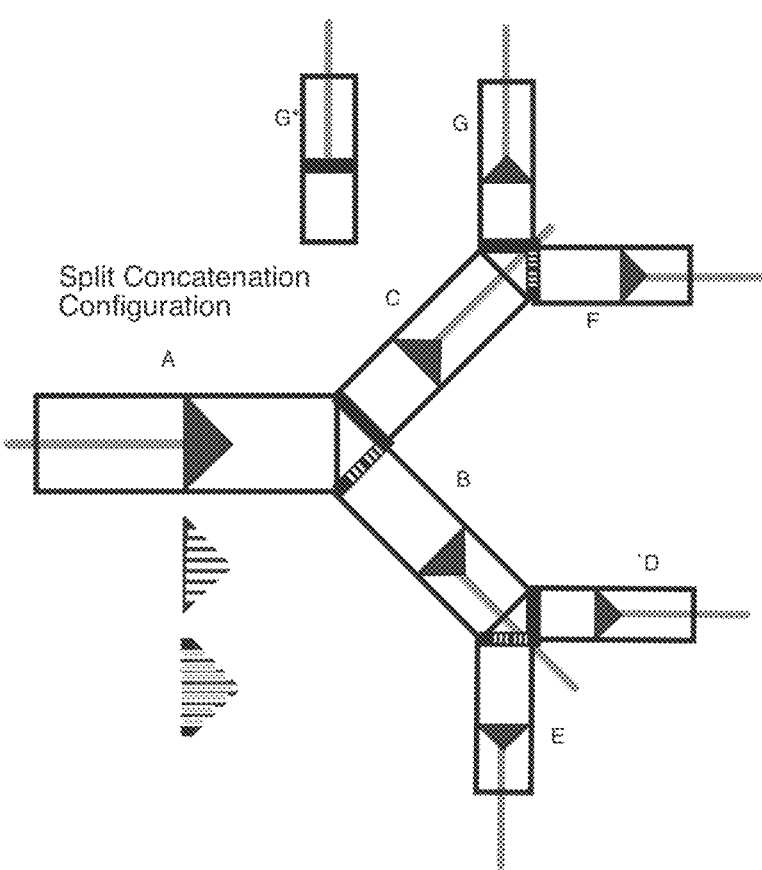

FIG. 10 Split Concatenation Configuration

This figure shows piston with a geometry that fits the situation where a certain MMP unit feeds into two MMP units that are connected over an arbitrary angle, not 180 and not necessarily 90 degrees. In this picture all the pistons are moved with an external rod.

Figure 11:
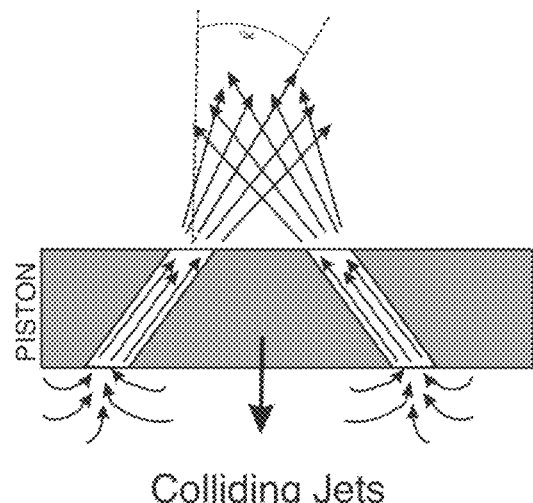

FIG. 11 Colliding Jets

This figure shows how two holes in the MMP are inclined towards each other so that the emerging fluid appears as colliding jets leading to very efficient mixing.

Figure 12:
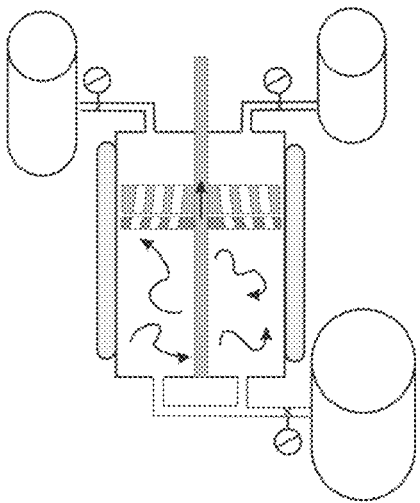

FIG. 12 A non-atmospheric pressure environment

This figure shows how an MMP unit operates from and two pressure holding containers.

Figure 13:
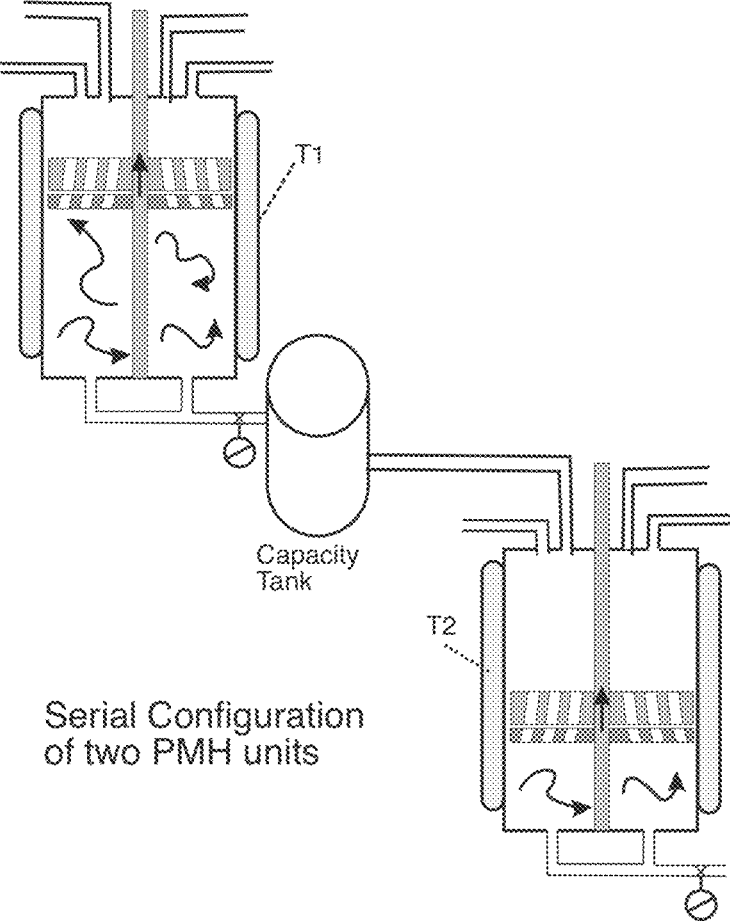

FIG. 13 Serial Configuration with two PMH Units.

This figure shows an MMP set up wrapped with a heat exchanger (PMH) where two units are connected via a capacitor tank.

FIG. 14 Cintegrator Options

This figure show a cart where integrated MMP units form a compact network designed to carry out a complex chemical engineering operation and managed by unskilled operators who need only to hook up the feed containers, to product container and the refuse container, push a button and let the built in control system run the packed sequence of MMP units.

The bottom drawing shows a patient being hooked to a medical processing device implemented as a network of MMP units.

Figure 15:
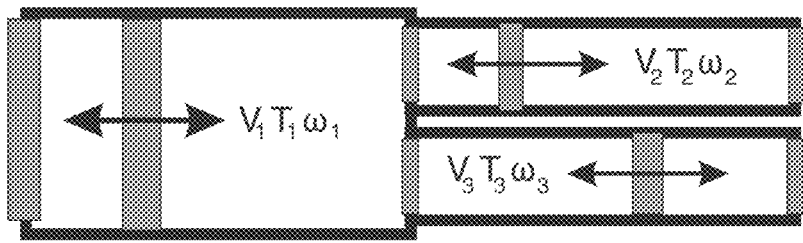

FIG. 15 Divided/Combined Quantum Configuration

This constellation as shown in this figure can depict division or adding. Division: a quantum fluid processed in the wide unit is pushed to the two narrower units which together house the volume occupied by the quantum fluid in the wide unit. This means that $$V_1/T_1 = V_2/T_2 + V_3/T_3$$

where $V_i$ is the volume of unit i, and $T_i$ is the time a quantum of fluid is held in unit i.

If the above equation is not held then it is possible to add waiting time to any unit.

$w_i$ represents the rounds the moving MMP is doing in each unit.

Figure 16:
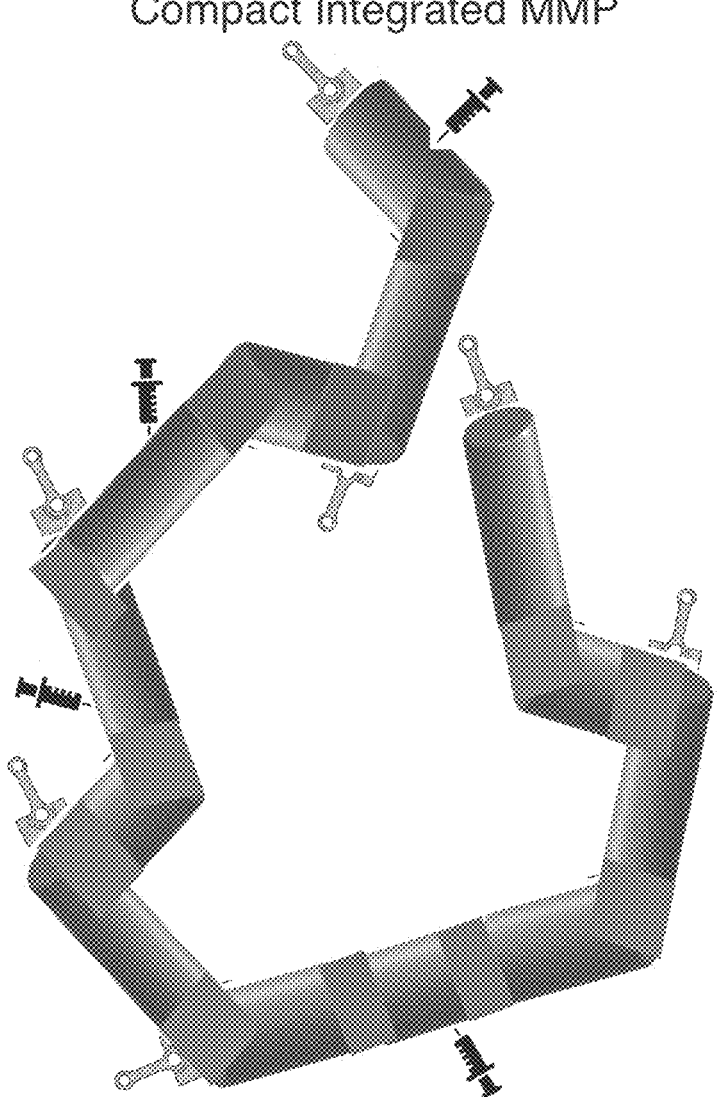

FIG. 16 Compact Integrated MMP

This figure shows how MMP units are linked in an arbitrary spatial configuration where external rods push the MMP for each unit, and injectors are fitted in various places.

Figure 17:
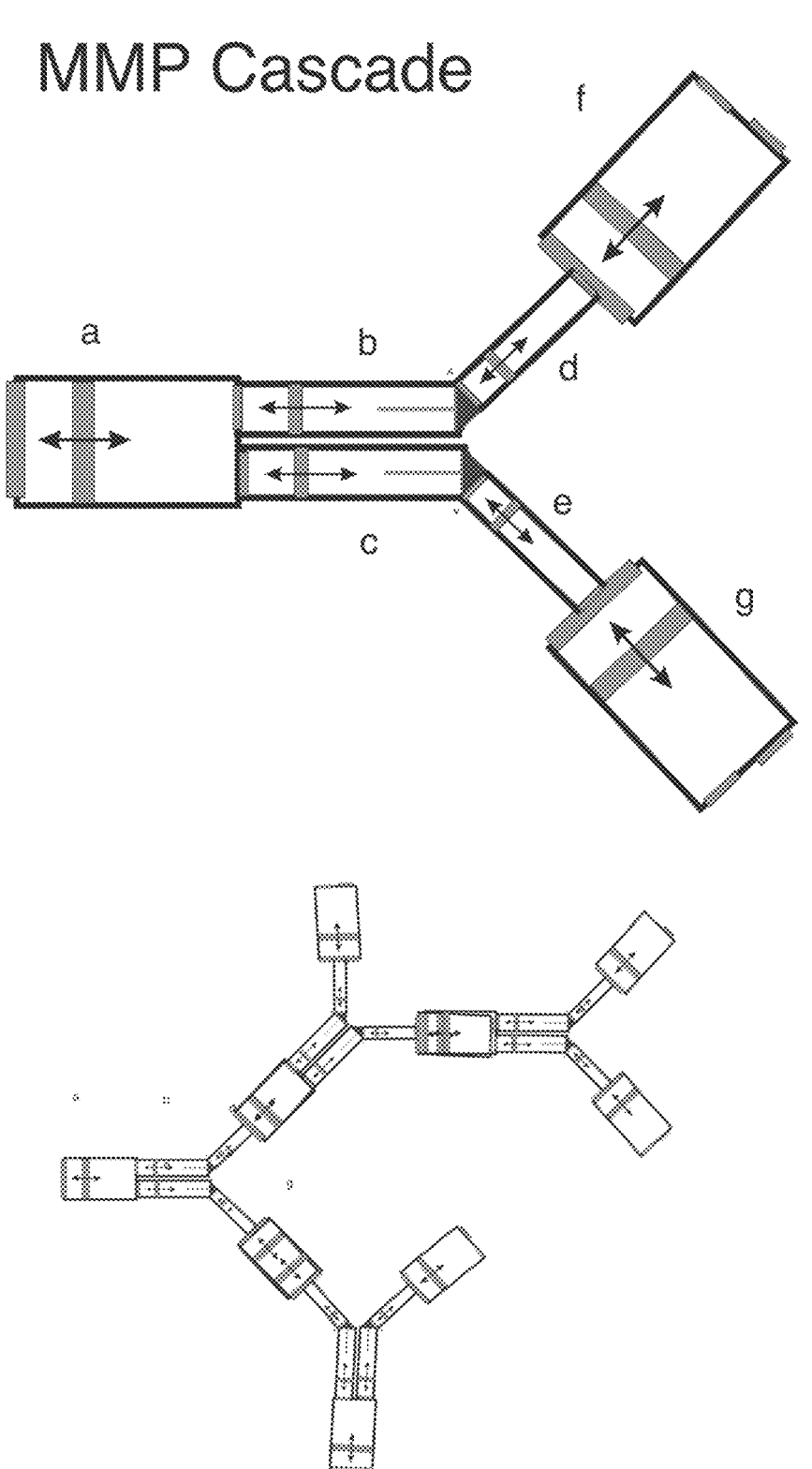

FIG. 17. MMP Cascade

This figure shows how MMP are connected in various angles where they are in various diameters and various length and they can be extended to more splits and more units time and again as the process demands.

Figure 18:
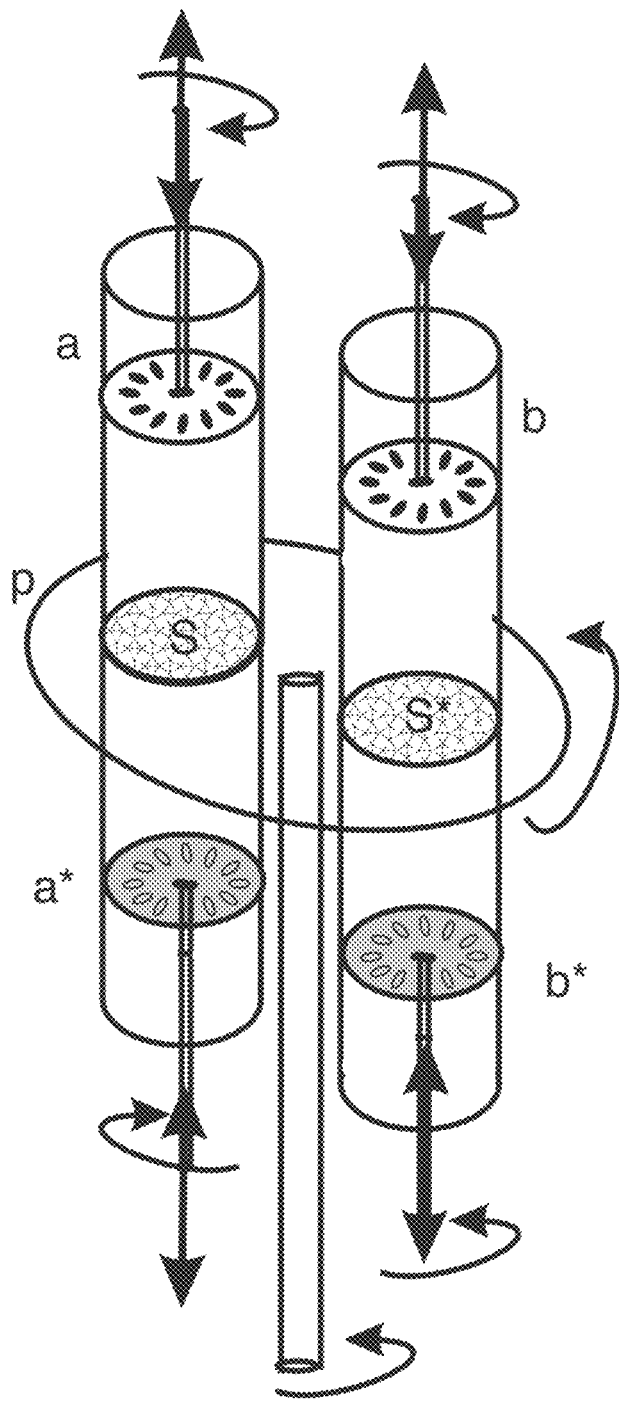

FIG. 18: Exchange and Replenish

This figure depicts a process in which a flow of fluid is passed through a sieve, a layer of a solid substrate which interacts with the go-through fluid in some way, usually an exchange where either material deposited on the solid substrate is passing to the fluid, or vice versa, some contamination perhaps is cleared from the passing fluid and is deposited on the substrate. We use the general term 'exchange'. The exchanging fluid is pushed through the MMPU (a) towards fixed layer of the sieve (substrate), marked(s). The piston above the substrate, switches to closed position and pushes a quantum of fluid through the substrate s down to the part (a*) of the MMPU. Another piston fitted in the (a*). section of the MMPU, again in total 'closed' state is pulling the quantum of fluid through the sieve S. Next the upper piston is resting abreast of the sieve while the bottom piston moves abreast of sieve S in an open state. Once there the bottom piston switches to closed position and is pushing down the quantum of fluid that just past through the sieve, while so doing it pulls in the next quantum of fluid from section (a). Following a certain number of quanta of fluid the sieve S is considered exhausted and must be replenished. For this to happen the two pistons above and below the sieve are being positioned in a closed state abreast of sieve S. When so, the plate (p) is being rotated and the exhausted sieve is turned around to fit into same size MMPU (b), while the sieve (S*) fitted in MMPU (b) is being rotated to fit in the place where sieve S was placed. Once so the exchange sequence can continue in MMPU (a). The upper piston in MMPU a is set to open state, and is moved up to capture a quantum of fluid ready to be pushed through the new replenished sieve and so the exchange fluid-sieve keeps on going.

The exhausted sieve S is now placed where sieve S* was fitted before. The two sieves exchange places through the rotation of the plate (p). in MMPU (b) a similar processing occurs only that the fluid in (b) is replenishing the exhausted sieve so that when the current operating sieve is exhausted, the newly replenished sieve will rotate back to MMPU a and so keep the process where two sieves are rotated between two MMPU to effect an ongoing exchange fluid-solid.

Figure 19:
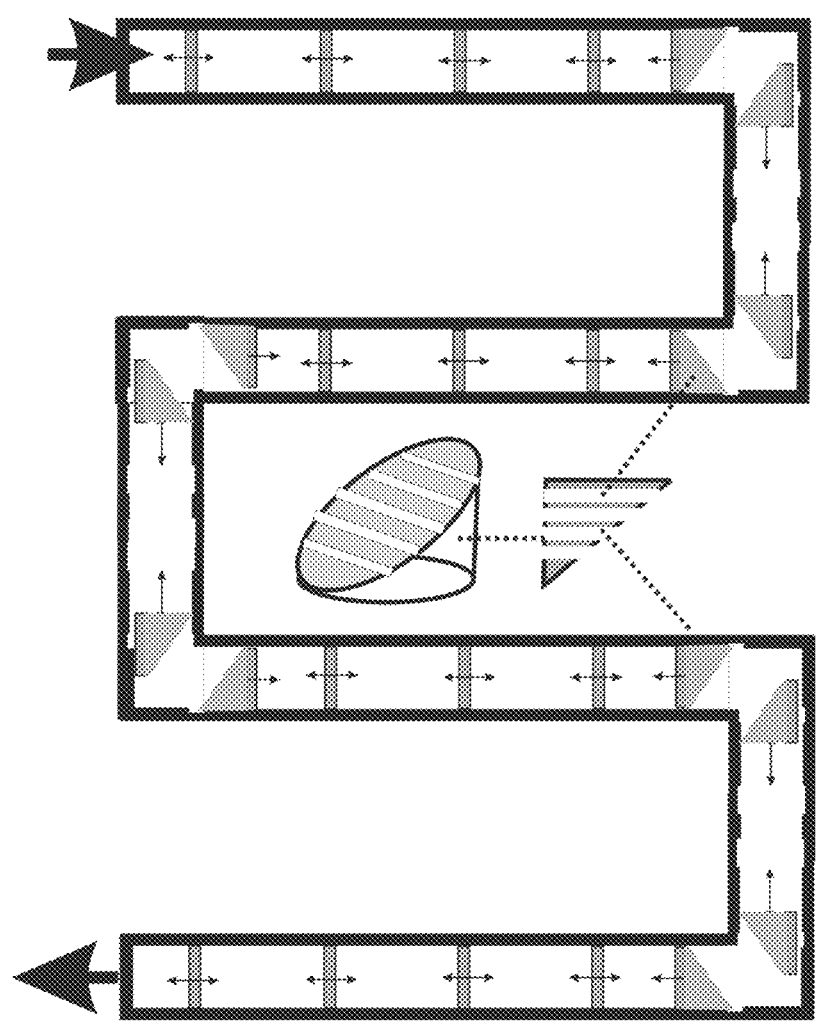
Figure 20:
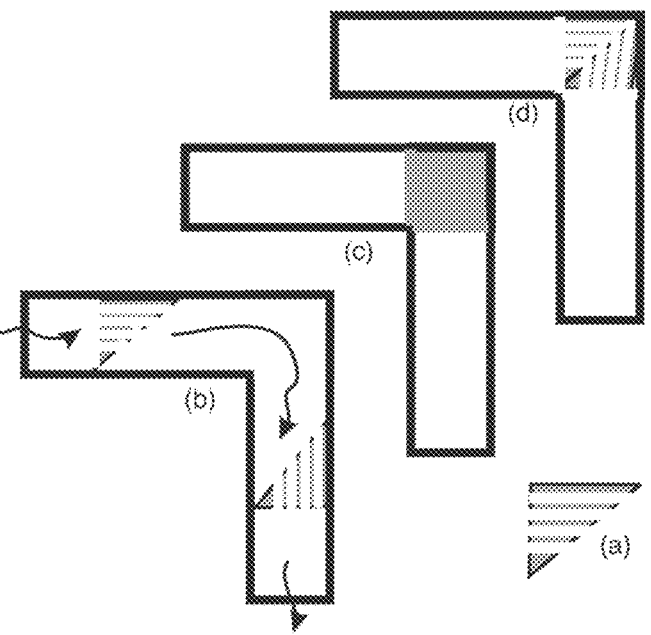

FIG. 19: Colon Style MMPU Line Sequence

This figure shows how basic MMPU may be assembled into a linear sequence which is compactly packed in order to take less space. The figure shows how the fluid goes at the top and comes out at the bottom. The elongated capsule contains a large number of laterally moving pistons which are of normal configurations except when the line bends into a perpendicular direction. For such bending to occur the piston takes the shape "triangular piston" as depicted in the middle of the figure. Two such triangular pistons fit against each other over a corner of the MMPU sequence. This corner can be extend to any of the four perpendicular directions from the current direction of the MMPU sequence. Corners turns are free to be put anywhere in the MMPU linear sequence in order to build a "colon like" wrap around sequence of MMPU.

FIG. 20. MMPU Knee

The figure shows how triangular pistons move normally on a straight stretch then touch each other when they meet over a bend, a knee in the construction of the sequence of basic MMPU. Part 9*a*) depicts the triangular piston with holes shown. In part (b) the pistons are shown in the linear stretch, in part (c) two pistons meeting over a knee fully touch each other when all fluid passage holes are closed, and in part (d) the two triangular pistons meet each other with all the holes open allowing the fluid to negotiate the knee.

Figure 21:
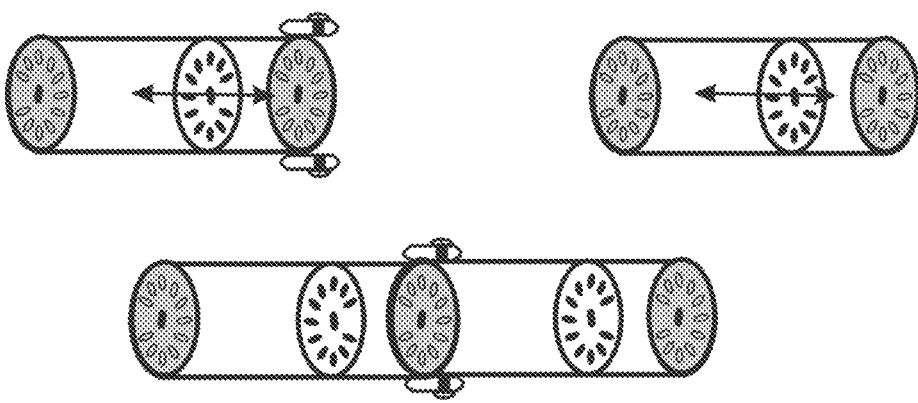

FIG. 21. Hooking Up Two Basic MMP Units.

Figure 22:
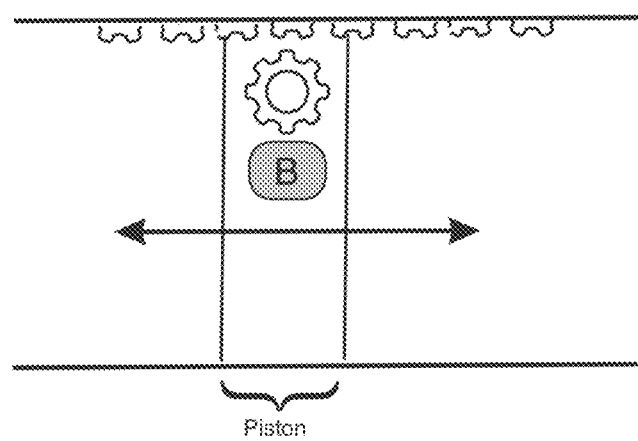

This figure shows two basic MMP units fitted with a external hooks to create a two units sequence. The stationary pistons from both units are touching each other, FIG. 22 Internal Battery Empowered Multi Mode Piston—Lateral Movement This figure depicts a piston moving inside its capsule. The inner side of the top of the capsule has bumpy stretch fitting a cogwheel at the top of the piston. The cogwheel is powered up by a battery placed inside the piston. The battery is controlled wirelessly (e.g. Bluetooth) from a control center dictating where the piston should move. If the piston is a single element then if there is one wheel then any rotation of the piston should take place only after the piston arrives at its destination. If there are t cogwheels in the piston then the piston can move laterally from t rotational positions. If rotation is accomplished by an inner rotational element and a non rotational envelope then a single cogwheel will do. The battery is fitted with a charging wire to be charged from outside while in rest, or is equipped with a wireless charger to be charged while in operation.

Figure 23:
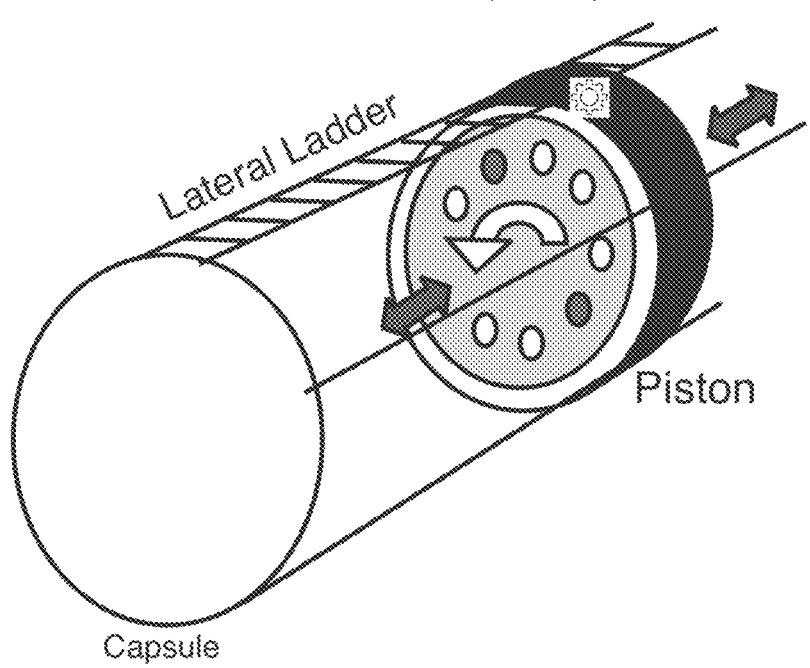

FIG. 23. Internally Powered Multi Mode Piston, Lateral, Rotational, Opening Control This figure shows the three dimensions of freedom of the moving piston. Black arrows indicate the lateral movement inside the capsule, and a "lateral ladder" is depicted at the inner side upper part of the capsule, this is the bumpy stretch used by inner piston cogwheel as it crawls laterally inside the capsule (the cogwheel is not depicted in the figure). A white turning arrow reflects the rotational capacity of the piston, depicted as an internal circular element that rotates inside an envelope (non rotational) element. There are various established mechanism to generate rotation of an inner disc, empowered by a rechargeable battery that is controlled wirelessly without. The figure further shows fluid pass way holes, two shown closed and the rest are open. So all in all the figure shows a multi mode piston that moves laterally, rotates and opens and closes its fluid pass way holes.

Figure 24:
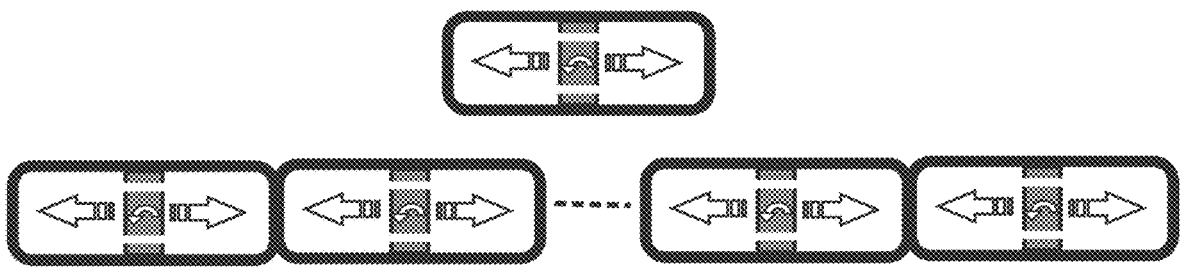

FIG. 24 MMPU as a "Lego" Building Block

This figure depicts an icon representing the basic MMPU. A moving piston that rotates is also free to open and close its fluid pass ways. The icons are shown one next to each other to indicate a linear combination of the basic units.

Figure 25:
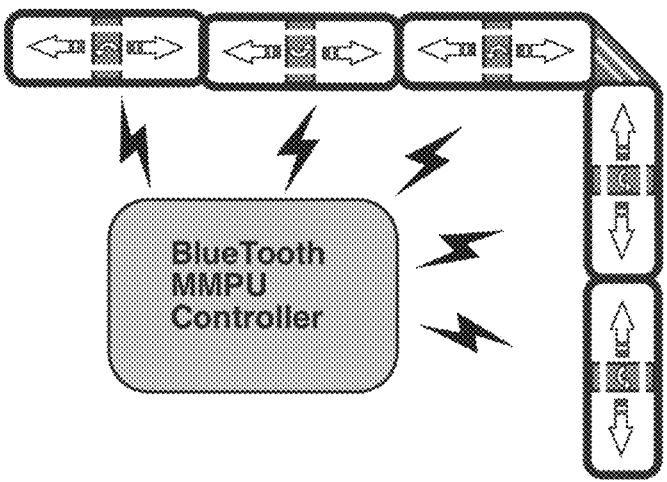

FIG. 25: Bluetooth Controlled "Lego" Construction

This figure shows a "Lego" construction of the MMP units, depicting a perpendicular turn built with a fixed triangular piston to accommodate the change of direction. The figure also shows a central control station that manages the states and the behavior of all the individual "Lego" MMP elements as together they perform a complex chemical engineering operation.

Figure 26:
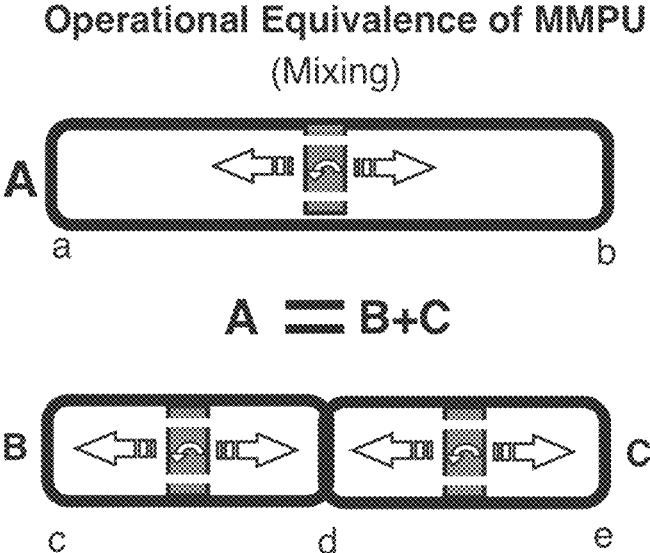

FIG. 26: operational equivalence of MMPU (mixing)

This figure shows two mixing setups one constructed from a single MMPU unit, A and the other constructed from two half size MMPU units, B and C. The equation shows A=B+C for the purpose of mixing. The moving piston in MMPU A may be put in closed state next to the left most stationary piston which is in fully open state. The moving piston then is moved all the way to the opposite edge of the capsule filling up a full quantum of fluid into the capsule. An air release option is fitted on the capsule so that the rightward moving piston does not build resisting air pressure. When the moving piston is abreast of the rightmost edge the capsule is full with a quantum of fluid.

The same feed of fluid may be pulled through MMP unit B when the moving B piston is attached to the left edge, where the edge piston is in open state and the B moving piston is in closed state. The B moving piston then is moved to the B rightmost position, pulling in half of the A quantum of fluid. Then the two B edges (the two B stationary pistons) are kept in open state, and the B moving piston is changed to open state. While so the C moving piston is pushed to the C leftmost position and is set to closed state. The C leftmost stationary piston is put in open state, and then the C moving piston is moved towards the C rightmost state. This movement sucks the half quantum of fluid captured in B and captures in unit C. This sucking pulls another half of fluid from the source through the leftmost stationary piston in B, so that when the C moving piston is abreast the rightmost stationary piston in C, then unit C contains the half quantum that resided in B and unit B contains another half quantum of fluid. In summary, the combination of units B and C accomplished the same operation carried out by unit A, pulling in a quantum of fluid into the MMP capsules. The quantum of fluid in A may be mixed into any desired degree the moving piston of A moving any desired number of times from one edge to the next and back. The same quantum of fluid divided into units B and C will be equivalently mixed through the two moving pistons in units B and C moving each between the respective edges. The result will be an equivalent mixing of the quantum of fluid in both cases.

The combination of B and C can be used to inject some additive, for example to the half quantum of fluid in B and then another additive when this half quantum of fluid is in unit C. In other words, the B+C setup offers more operational flexibility, but for plain mixing it offers a bit more complexity then unit A alone.

Figure 27:
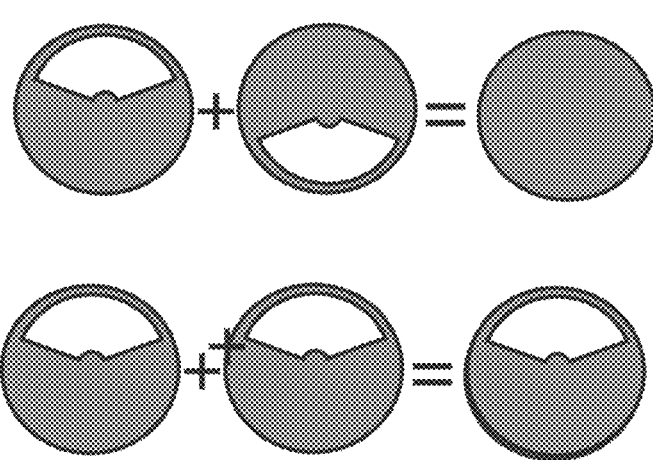

FIG. 27. Half Open/Close Two Discs Setup

This figure shows how a combination of two mutually rotating discs, each with an almost 180 degree of opening can be put so that the overall piston is closed—no fluid passes, or alternatively put in straight overlap where the piston allows fluid to flow through half of its cross section. In the figure—an opening is shown in white and a closed part is shown in grey.

FIG. 28 Fully Close/Open Disc Setup

This figure how an MMP may achieve either a full closed state, or a full open state. This is done with n discs, where each disc has a hole along an angle of $360(1-1/n)$, such that these discs can be configured to full overlap as in the bottom part or in a staggered mode for total closed state as in the upper part. The higher the value of n, the closer the degree of opening achieved.

FIG. 29. Six Pack Mutually Rotating Discs Pistons

This figure shows a piston comprising a 6 pack discs. where the discs can freely rotate and independently set the open/closed states of their holes.

FIG. 30 Rotating Piston—Cogwheel Basis

This figure shows a rotating inner disc with a cogwheel circumference that will fit into an internal line of cogwheel pattern to allow a built in power source to rotate the inner disc inside the external ring which houses the part that moves the piston laterally.

FIG. 31 In Pipe Pump

This figure shows how an MMP (a) that is set to move between two given points inside a pipeline (b,c) is effecting a pumping action. Going from b to a with all its holes in closed state, and returning from a to be with all its holes in open state, and so repeating. If the MMP is run by an internal rechargeable battery then the pump is located inside the pipe where the fluid flows.

FIG. 32 In Tube Pump

This figure depicts a small tube, like a biological vein or artery in which a tiny MMP is fitted and serve to assist in moving forward the liquid inside the tube.

FIG. 33 Tailored Heat Exchangers

This figure shows two connected MMP units where each unit is wrapped by its special heat exchanger setting up the desired temperature in each unit.

FIG. 34 Separation Configuration

This figure shows a pre separated fluid feeding into an MMP unit (A) where a separation process is conducted. The enriched part is routed to MMP unit C and the other part to unit B. The arrows show how the different parts from successive units are routed and how each part of the original pre-separated fluid goes either to highest separated part or to recycling back as pre-separated fluid or to refuse. Various configurations are possible.

FIG. 35 Rotational Disc inside a Non Linear Piston

This figure shows a non circular piston in a non-circular capsule. Needed if the shape of the capsule is necessarily of an odd shape to fit some situation.

Figure 36:
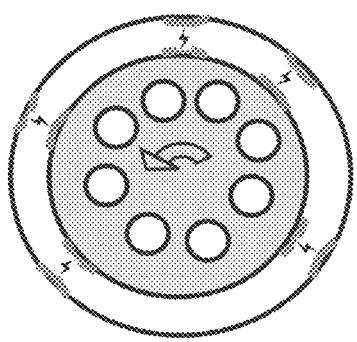

FIG. 36 Electro Magnetic Rotation

This figure shows a rotational disc within an MMP where the rotation is driven by electromagnetic forces between electro magnets on the rotational disc and on the enclosing part of the piston.

Figure 37:
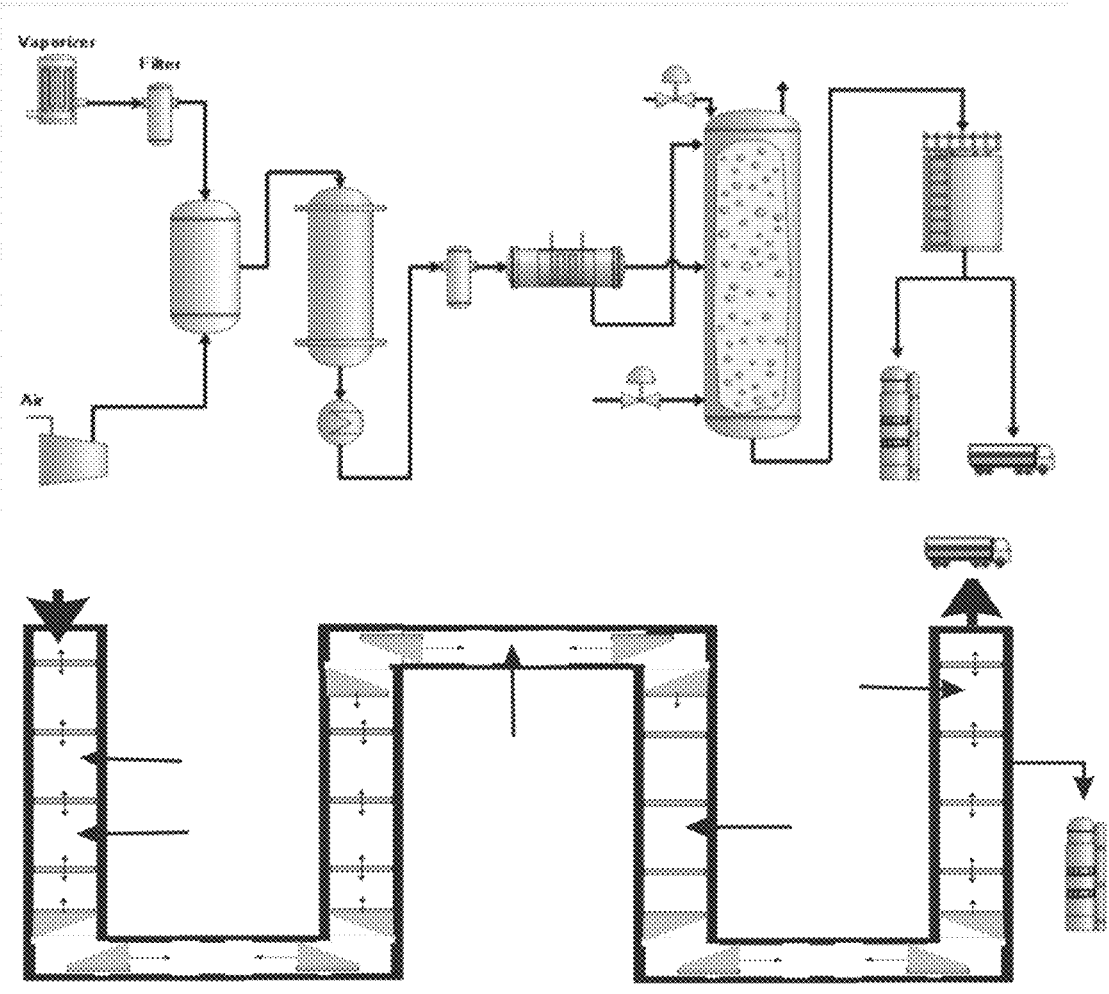

FIG. 37. Classic Chemical Engineering v. Multi-Mode Piston Modular Construction This figure compares the standard construction of a chemical engineering solution to industrial capacity of production, to the modular approach which is based on the notion that the multi mode piston unit has enough built in versatility to adjust its operation to meet most if not all chemical engineering challenges when it comes to fluids. This modular approach comes with built in advantages, ease of design, AI ready optimization, re-use of equipment, shifting variability from expensive hardware to less expensive software. So instead of manufacturing special purpose tanks, pumps and pipelines, one is assembling MMP unit building block to meet the same challenge.

Figure 38:
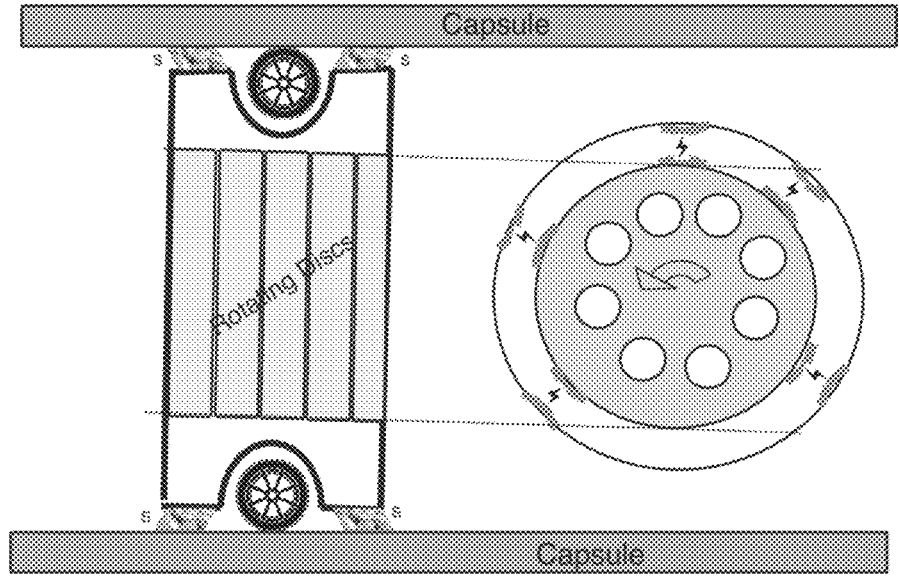

FIG. 38. Rolling Piston with 5 Rotating Discs

This figure depicts a piston powered by an internal battery that rolls wheels that create friction with the inner wall of the capsule and thereby facilitate movement back and forth of the piston inside the capsule. The figure shows(s) the sliding sealants fitted before and after the wheels to prevent the fluid from getting into the piston. The piston is featured with a pack of 5 rotating discs that rotate with electro magnetic forces.

Figure 39:
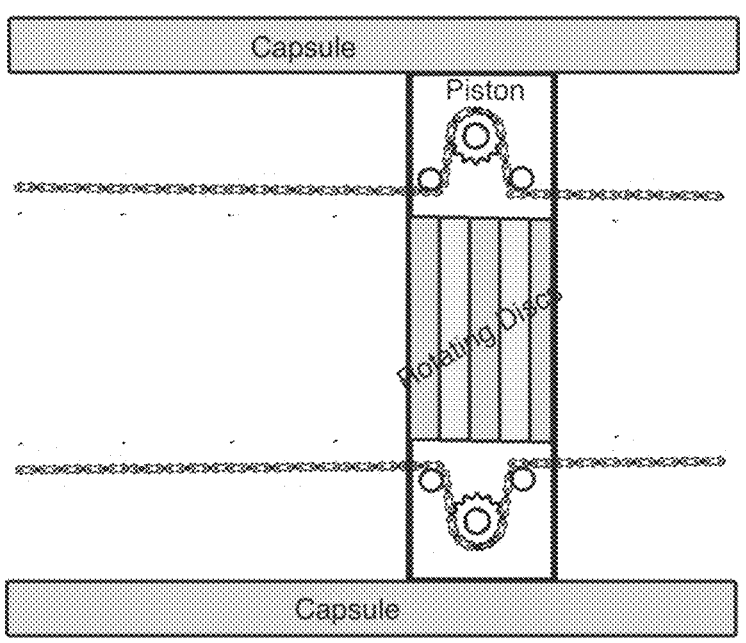

FIG. 39 Pulled Chains Pistons

This figure shows a multi mode piston which pulls itself to either direction with in engulfing capsule by pulling chains that are hooked to the edges of the capsule. The power is supplied by a rechargeable battery. The chain are kept taught through their hooks into the edges of the capsule. The figure also shows a disc pact of rotating discs inside the piston.

Figure 40:
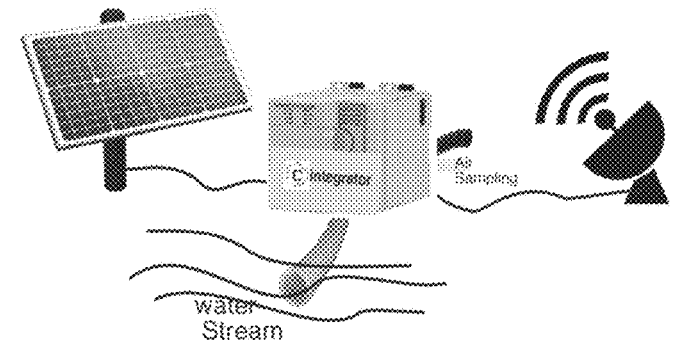

FIG. 40 Remote Location Durable Chemical Processing

The Cintegrator is shown posted on a remote location where it samples water stream and air and subject them to certain processing and analytic procedures, by using MMP units integrated for the purpose and packed into a processing package which gets energy from the sun and broadcasts its finding to its depositor.

Figure 41:
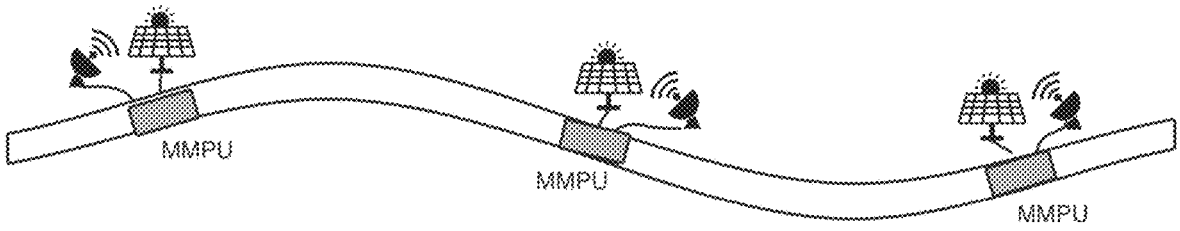

FIG. 41: In-Pipe Pumping and Analytics

This figure shows a buried or exposed pipeline stretched over an open area, may be wilderness. MMP units are placed with intervals inside the pipeline. They provide pumping and analytics. They are equipped with fluid impact media that undergoes a reaction with the pumped fluid, and an internal monitor reads the results then broadcasts them to the agency in charge. The pumps may be solar powered.

Figure 42:
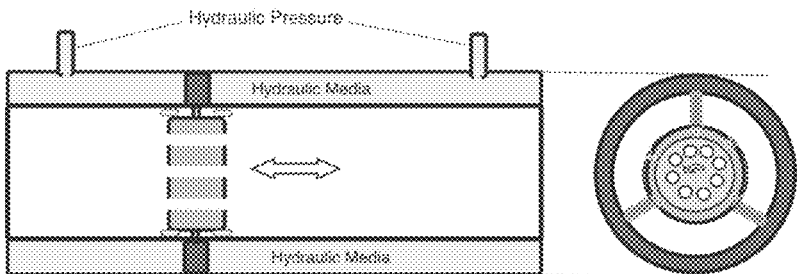

FIG. 42 Hydraulic Power MMPU

In cases where the fluid is viscous the piston must be operated with a great power which is naturally supplied through hydraulics. This figure shows a piston connected through three axes to an external ring that is fit in an enveloping cylinder containing hydraulic media which is pressure controlled by a hydraulic source to move the piston back and forth against great resistance. The piston is fitted with dynamic sealants and the axis are kept tight by pressing elastics along the slit where the axes move back and forth as they connect the external ring subject to hydraulic pressure with the internal piston that is dragged back and forth with this hydraulic pressure. Rotation and holes states open/close can be operated with much less power, hence they are run with a battery.

Figure 43:
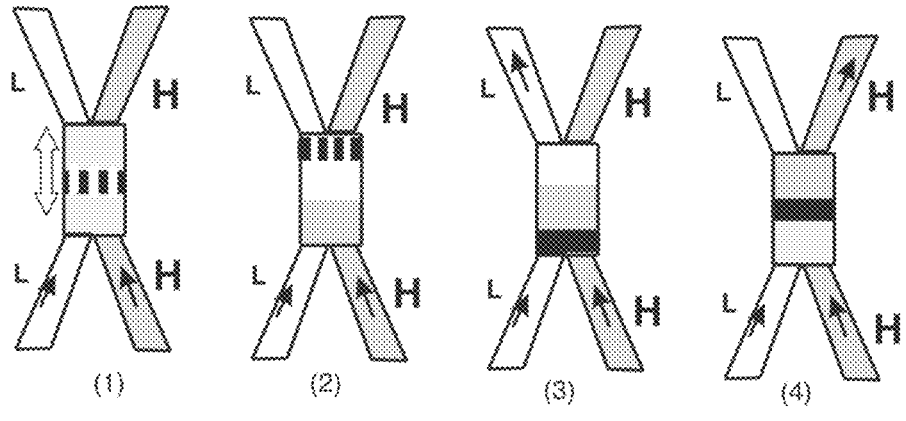

FIG. 43 Material Exchange Between Two Non-Mutually Dissolving Liquids

This figure shows a vertical MMPU fed by two mutually non dissolving liquids of different specific gravity, the heavy fluid designated H and the light fluid designated L. A certain ingredient X is embedded in one of these liquids, but is chemically inclined to change residence to the other liquid—given the chance. The chance is given by establishing a large contact surface between liquids L and H. The greater the contact surface for the longer time, the more of X moves to the opposite liquid. In part (1) the figure shows the vertical MMPU fed by two sources (likely they are MMPU too) one for H and one for L. The filling up step is not shown. In it the moving piston inside the vertical MMPU is set to close state, while staying the bottom, then moving upwards to the top, thereby sucking both L and H to the MMPU capsule. The capsule is then locked, and the moving piston in the MMPU is switching to open holes. The piston is then moving up and down as many times as desired (as shown in part (1)) this creates thorough mixing of L and H allowing for X to move from where it is before the operation to where it will be found afterwards. After enough rounds of the piston going up and down, the planned transfer of X has been accomplished. When so then the piston in the MMPU is moving to the very top, and stays there to allow gravity to work and separate the two liquids, H is positioned at the bottom and L is positioned on top of it, as shown in (2). Next the piston in the MMPU—still with open holes—is moving down to the bottom of the capsule and once there it switches its holes from open to close, as shown in part (3) of the figure. Next the piston in the MMPU is moving upwards while the light fluid, L is pushed to the L outlet. When all the L liquid has been pushed to the L receptacle (likely another MMPU), shown on the left side if the MMPU capsule, then the opening to the L outlet is being closed and the opening to the heavy liquid is engaged so that the H portion of the liquid in the capsule is being routed to the H receptacle, as shown in part (4). As the piston in the MMPU is moving upwards to dispose of the treated quantum of fluid, it also sucks in the next quantum of fluid ready to undergo the same treatment. The result is that the ingredient X exchanged residence between L and H, and L and H are separated as before. This will also work if at the same time some other ingredients X', X", . . . are being exchanged from one liquid to the other, regardless of the direction of the exchange. This procedure can readily be extended to three or more mutually non immiscible liquids.

Figure 44:
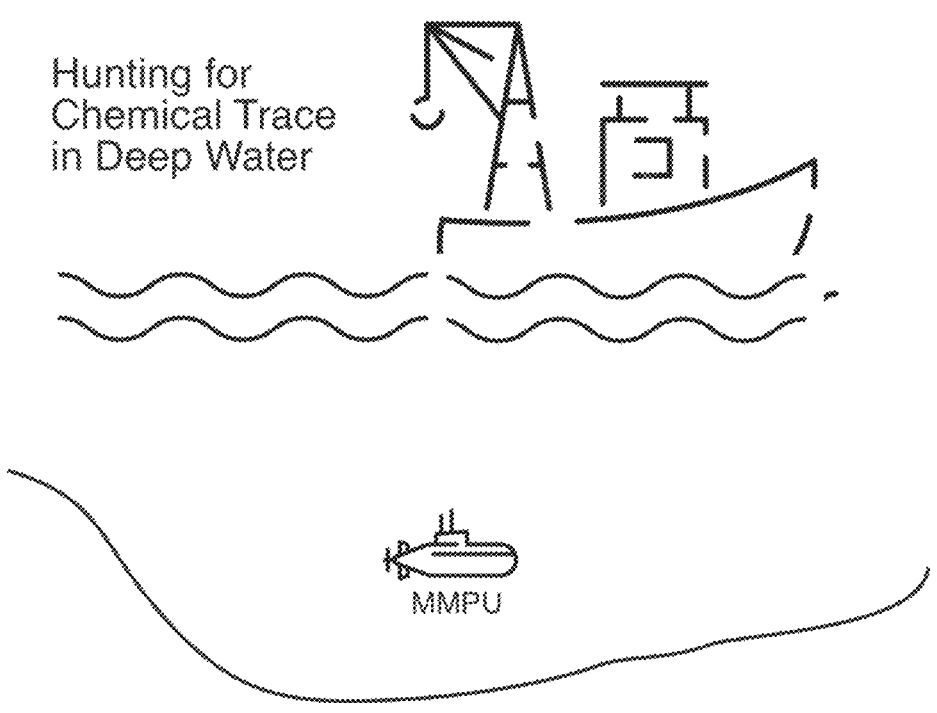

FIG. 44 Hunting for Chemical Trace in Deep Water

This figure shows a boat that sinks a diving MMPU in a body of water. The diving MMPU is programmed to randomly scan the water in various depth and repeatedly take in quanta of water and process them with an intent to detect a given chemical trace. Some traces are difficult to detect, they require a detection reaction with a built in flow-impact media, and the reaction may take considerable time, and may require a particular temperature. The MMPU will provide the necessary conditions to each quantum of water it works on. When the diving MMPU will be examined (either though wireless communication or through physical examination once taken out from the water), it will lead to the proper conclusion as to the existence of the trace of interest in the examined body of water.

DETAILED SPECIFICATION OF THE INVENTION

Overview: Using a rotating piston with controllable fluid passageways (multi mode piston, MMP) fitted in a capsule to form an MMP unit, MMPU, as building block to be assembled into an MMP network, MMPN, for carrying out fluid operations: pumping, mixing, reacting, separating, on various scales; replacing the common continuous operation with successive batch processing of quanta of fluids captured in an MMPU, powered either through (i) external rods and levers, (ii) external electrical motors, or (iii) internal rechargeable batteries. The MMP network of chemical engineering unit operations may be built in a very compact mode, is set for optimization by artificial intelligence, and is designed to be operated by unskilled operators. The "Lego like" design of the full scale chemical process is enabling disassembly and re-assembly of same equipment. The sound principle of the multi-mode piston extends its applicability to micro dimensions on one end, and large industrial scales on the other end. This invention describes (i) the multi-mode piston itself, (ii) the multi mode piston within a capsule that captures a quantum of fluid, and (iii) multi mode piston units linked to carry out start-to-finish chemical operation.

The underlying innovative idea is that the multi-mode piston unit is versatile enough to be tailored to the full range of fluid handling processing, and hence it can serve as a building block to a large variety of processes, and also the different states of the MMPU are readily digitized, inviting AI tools to practice live updateable optimization of the carried out processes.

INTRODUCTION

A piston is a device that is used to engage fluid. Commonly the piston moves the fluid in its direction of movement. Proposing to expand the range of engagement from 'moving forward' to other modes of engagement, thereby creating a multi-mode piston. In particular the piston may be modified such that it has pathways for the engaged fluid to move in a counter movement to the direction in which the piston is going. The fluid that goes through the pathways may be subject to various actions serving various goals. One can engineer pathways for the fluid through the moving piston such that the effect on the fluid will be (i) mixing, or (ii) separation, (iii) electrical charging, etc.

The vision before us is therefore of an operational building block based on a multi mode piston (MMP), integrated into a battery or a train of such pistons apparatuses designed to carry out a complex operation with fluid.

This notion begs the suggestion that unit operations common in chemical engineering may be carried out in a new way, challenging the traditional means of putting together an industrial grade fluid operation.

Essential to the nature of a piston is the concept of a back and forth movement. A piston is moving one way in a straight line, and backwards, reversing its forward movement. This reversible action inherent to the notion of a piston can be used in designing the envisioned MMP trains.

Back and forth movement suggests the possibility of action amplification, which in turn requires that the engaged fluid will be the same relative to this amplified, repetitive action. This thought brings to mind the idea of selecting a well defined quantum of fluid to be engaged by the MMP. We see ahead then an MMP train operating over a quantum of fluid, say then that the MMP operation is associated mainly with quantum fluid operation (QFO). This is regarded as the MMP-QFO connection.

Ahead we lay out the construction and the applications of the MMP-QFO.

Abstract Definition (MMP Systems)

Using abstraction as viewing lens the MMP unit is as a combination of a back and forth moving piston with fluid passage holes that may be controlled to switch between 'open' and 'close' states, where fluid is held in a surrounding container. The shape and the construction of the piston pathways (holes) are set to serve an operational purpose over the treated fluid.

MMP units (MMPU) can be threaded together in a linear sequence or in a network, MMPU can be cascaded: contain one or more MMPU inside them. An MMPU-Network (MMPN) may operate as a complete chemical/physical process, leading from raw materials to products and disposables. An overriding control system manages the motions of the pistons, and the dynamic state of each fluid pathway on every piston.

The MMPA is based on quantum fluid operation (QFO) wherein a quantum of fluid is taken in to a contained volume surrounding the multi mode piston, is treated in batch mode, and when done, is disposed of to the next stage in the overall process.

The overall chemical/physical process appears to be continuous to the outside world, but inside the process proceeds one quantum of fluid after the other. The MMPU may be threaded relaxed—where a capacitor tank separates between the MMPU so that each MMPU can operate in its own pace and with its own volume of quantum fluid, and the capacitor negotiates the momentary differences between the MMPU. Alternatively the MMPU can be tightly stuck together, synchronized, and operate with no capacitors in between them.

MMP units can be assembled in (i) a relaxed mode, or (ii) a tight mode.

Relaxed Assembly

In a relaxed assembly every unit is sucking the fluid amount Q from one or more capacity tanks, and is discharging its fluid contents to one or more capacity tanks. A capacity tank to which a unit discharges may serve as the inlet tank to the next MMP unit.

The fluid capacity tanks separating the MMP unit (MMPU) allow for an indefinite chain of MMPU to be constructed. Furthermore, capacity tanks provide for network construction wherein a given capacity tank is fed by one or more MMPU, and is feeding one or more MMPU.

Tight Assembly

We consider a fluid container, designated as 'the cylinder' although its shape is not restricted to a geometric cylinder.

The cylinder is fitted with at least one inlet and at least one outlet. In the cylinder a multi mode piston is fitted. A multi mode piston (MMP) is a piston that may act like a normal piston but in addition can force fluid to pass through holes in it such that this passing creates a desired effect on the fluid. The MMP is capable of back and forth movement stretching between the at least one inlet and the at least one outlet.

The cylinder so fitted with the MMP is designated as basic MMP unit, or 'unit' for short. A unit is designed to suck through the at least one inlet a well measured quantity of fluid Q, treat (process) Q, for a given time T, then discharge Q through the at least one outlet. This is regarded as the unit cycle. The treatment step may be comprised of several rounds of movement of the MMP between the inlet and the outlet where each movement may stop at any point along the motion line.

While the treatment T happens, it may be augmented through exchange of matter and energy through the walls of the cylinder. Such are an enveloping heat exchanger, various injections, etc.

As described a unit i will exercise a unit cycle comprised of sucking Q into the cylinder, step $S_i$, followed by treating Q inside the cylinder, $T_i$, which is followed by the discharge step $D_i$. The entire sequence: $S_i$-$T_i$-$D_i$ takes a 'unit time' $t_i$.

Two MMP units i and j may be connected in series so that a quantity Q as it is being discharged from unit i enters into unit j, which we designate by writing: $D_i$=$S_j$. Such connection may be extended to n units, to be marked as follows:

$$S_1 - T_i - D_1 = S_2 - T_2 - D_2 = S_3 - T_3 - D_3$$

So a quantum of fluid Q is moving from unit 1 to unit 2 and so on. The time spent in each unit is $t_1$, $t_2$ . . . . Let $V_i$ be the volume of cylinder i, and let $V_j$ be the volume of cylinder j. Let further j=i+1. For the quantum fluids to flow $t_j$ will have to range from $t_i$ to $(V_j/V_i)*t_i$.

A unit i ($U_i$) may have its discharge split between two or more subsequent MMP units: $U_{ia}$, $U_{ib}$, . . . .

We write:

$$U_i \rightarrow (U_{ia}, U_{ib})$$

and similarly for a split into more than two units.

The linear extension and the split extensions described above are iterative and can be applied indefinitely.

The MMP Unit

The Multi Mode Piston Unit (MMPU) is comprising a series of Multi-Mode Pistons, which can each slide along a shared axis perpendicular to the pistons surface. The sliding pistons are placed in a fluid container that fit snugly over the moving pistons. The MMPU is operated by a control unit running a power source that changes the states of the pistons.

A multi-mode piston is fitted with passage ways (holes) through which fluid passes. These passage ways may be in a closed state each, a fully open state each, and a partially open state each, together identifying the "passage state" of the piston, p. Each piston has a sliding range across the sliding axis, s, and each piston may rotate around its sliding axis, and be in rotation state, r. At any time, t, the state of any MMP is identified through its passage state, sliding state, rotational state, M(t)={p(t) s(t), r(t)}.

Ahead we describe (i) the basic MMPU, (ii) compound MMPU, and (iii) non-ordinary MMPU Basic MMPU The basic MMPU (MMPUb) is comprising three MMPs. Two stationary MMPs (zero sliding range), placed a "process distance", δ, one from the other, and an intermediary MMP that can slide along the process distance and move from a state of being abreast with one stationary piston to being abreast of the other stationary piston. Generally the stationary pistons do not rotate, and their fluid passage holes are either in 'closed' position or in fully open position. The intermediary piston has a δ sliding range, a 360 degrees rotational range and its passage ways may be closed, fully open or partially open.

Nominally the piston surface is a circle and the enclosing envelope is a cylinder, but other geometries are possible too. Let the inner area of each of the pistons be A, and let the volume of the intermediary piston (MMP) be $V_p$, then this apparatus contains an empty volume. $V_q$=δ*A-$V_p$.

MMPUb operation: The standard operation of the basic MMPU is comprising three stages: (i) loading, L(ii) processing, P. (iii) discharge, D. Fluid is loaded into MMPU through one of the stationary pistons regarded as piston-in. Fluid is then undergoing what is regarded the "payload processing"—the target processing for which the MMPU is built and operated. When the payload processing is complete the processed fluid is discharged. Say then that the MMPU takes in a quantum of fluid, Q which fills the empty volume within the MMPU apparatus, namely Q is of volume $V_q$. Q is then separated from fluid up and down the fluid stream, is processed to satisfaction and then pushed out down stream.

The MMPU operates inside a fluid stream. The apparatus takes in a Q from up stream and discharges that Q after payload processing into the down-stream. So MMPU operates in batch mode embedded in continuous flow mode.

Flow: [Loading][Payload Processing][Discharge]

Generally the quantum fluid cuts are operated on sequentially. At a given moment the MMPU volume contains a Q of fluid. When payload processing is done, Q is discharged downstream. While so, a new quantum of fluid is sucked into the MMPU from the upstream. When it finishes its processing phase, it is discharged downstream and while so a new quantum is loaded into the MMPU.

The MMPUb operation proceeds as follows:

Loading: at a starting point t=0, the intermediary (sliding) piston is positioned abreast the piston-in. Its holes are all in a closed position. The passage ways (holes) in the two stationary pistons are in full open position. As time moves on so does the intermediary piston: it moves from position x=0 to position x=δ, namely from being abreast piston-in to being abreast piston-out. The holes on the intermediary piston remain closed, and the holes on the stationary pistons remain open.

Payload Processing: once the quantum of fluid, Q is loaded, then the second stage takes place: payload processing. In this stage the holes in the two stationary pistons are closed and the sliding piston opens its fluid passage way. The sliding piston can also rotate around its axis of motion. The sliding piston is traveling between the two stationary pistons. In the simplest application the motion is from being abreast with piston-in (x=0) to being abreast with piston-out (x=δ), and then back again to x=0 and x=δ. The passage of the slider piston. 0≤x(t)≤δ may vary according to the application. The time taken by the payload processing is also a variable and depends on the application. The slider piston does not need to move from one extreme to the other. It can mark any motion within its sliding range—application dependent. While displacing along the x axis (the axis of motion) the slider piston can rotate at a rate and direction of choice. However when the payload process is finished, the position of the slider piston is x=0 (abreast piston-in).

Discharge: when payload processing is done, discharge begins. The holes in the stationary pistons open, and the holes in the sliding piston are closed. When the discharge starts the slider piston is located at x=0 displacement spot. It then moves to x=δ, and as it does so it pushes out the quantum of fluid captured in the MMPU (and processed in the payload processing). The push out happens through the piston-out. As the push out takes place, the next quantum of fluid is sucked in from the upstream. So after the first quantum of fluid is processed, discharge of one quantum fluid happens at the same time when the loading of the next quantum fluid happens.

The MMPU may be fitted with parts that impress an impact on the quantum fluid undergoing the payload processing. Such impact may be (i) injection of material, (ii) change of temperature, (iii) radiation, (iv) gravitation.

The payload process serves a well defined operational aim. This aim is achieved through application of the external elements that impact the captured quantum of fluid, Q and by the dynamics of the sliding piston.

At any moment t withing the payload processing time interval, $T_p$, the sliding piston is defined as a point in a h+2 dimensions space, where h is the number of holes (passage ways) in the sliding piston. This dimensions define 1. the sliding position x(t) of the sliding piston on the sliding interval, 2, the rotational position. ω(t) within the 360 degrees rotation range. Each of the h holes is defined by its percentage of open state between 100% open to 0% open (closed state) and any partial opening in between: $h_1(t)$, $h_2(t)$, . . . $h_h(t)$.

These h+2 values are all independent of each other, they are collectively defined as the H state of the piston. H (t) is over the $T_p$ payload process time interval is a line drawn on the h+2 dimensions state. Each such line is a processing strategy. These strategies may be ranked per their efficiency towards the payload's aim. One can use transport phenomena science in order to identify a good strategy (a good line on the h+2 dimensions space). Alas the attributes of flowing fluids may be too much of a challenge for analytical handling. It might be much more effective to apply AI techniques to explore optimization of the payload process.

The basic idea of the MMPA is the forced flow of the quantum fluid through the passage ways of the piston. These passageways, holes are designed to fit the payload process. They come with a great degree of freedom. These passageways may be small and narrow or large and wide. The passage ways may be thin, and shallow or deep and long (depending on the width of the piston). The passageways may be perpendicular to the face of the piston or may be inclined in an angel. Some holes may be inclined towards each other and some against each other. The lining of these holes may be smooth or rough, may be hot or cold. The holes may be arranged in various superficial geometries over the surface of the piston. All these degrees of freedom are used in order to make the payload processing more efficient.

We note that the trapped quantum of fluid is forced to flow through the holes of the moving piston. The speed of the piston directly determines the speed of the flowing fluid and the rotational state and the degree of opening of each of the h holes determines the dynamics of the flow and hence the efficiency of payload processing.

External Impact

We regard: temperature impact, injection impact, radiation impact and very rarely gravitation impact.

Temperature Impact

The MMPUb envelope may be surrounded by a heat exchanger to keep the temperature of the quantum fluid where it should be, hot or cold as the case may be. The smaller the diameter of the pistons the smaller the diameter of the envelope (the container of the fluid) and the more effective the heat exchange.

Heat can be exchanged by adjusting the temperature of the moving piston itself. Since the fluid is forced to pass through the holes, by adjusting the temperature of the lining of the holes—the parts that touch the flowing fluid, one achieves a very effective temperature adjustment for the fluid itself Injection There may be injectors fitted on the envelope designed to inject into the fluid any additive or ingredient that for various reasons is best if injected from without. The control system will decide how much to inject at which moment in the payload processing.

Similarly the envelope may be fitted with a small drainage designed to suck a small sample of the operated fluid for any one of many tests.

Radiation

Any range of radiation may be applied to the envelope to serve a given payload process.

Gravitation

The MMPUb may be put inside a centrifuge.

Embedded MMPUb

The MMPUb is sucking a quantum of fluid from a fluid source upstream, and after payload processing the quantum it discharges it to a receptacle down stream. Nominally the sucking in of the next quantum of fluid, Q', happens when the processed quantum Q is being discharged. These two actions happen in parallel as the holes in the two stationary pistons are open and the holes in the sliding piston are closed.

The upstream and downstream fluid handlers may be (1) capacitors or (2) may be synchronized.

Capacitors are tanks that contain a reserve of the fluid so that the discreet process of sucking and discharging quantum's of fluids does not impact the process before and after the MMPUb—the capacity of the capacitors allow for a discrete fluid handler like MMPU to fit in a continuous process without interruption.

In a synchronized setting the upstream source provides exactly a quantum of fluid when the MMPU demands one and the receptacle source downstream is available to take in the discharged quantum when discharge happens.

Networked MMPUb

MMPUb may be lined together in a linear setting: $P_1$, $P_2$, . . . $P_n$ where each MMPUb performs a distinct payload process. These processes may be a repeat of each other or very different from each other.

A linearly linked system of MMPUb may operate with capacitors between the units or in a synchronized way. If synchronized then the payload processing time $T_p$ for each of the n MMP units should be the same. This can be readily achieved, as follows:

Let unit i in the sequence of n MMP units require the longest payload processing time $T_{pi} \geq T_{pj}$ for every i≠j. In that case the control system for all the units except unit i will slow down their operation, or stop it all together in order to achieve equality $T_{pi}=T_{pj}$ for j=1, 2, . . . n A typical example will be a sequence of injections of various materials to develop a final product. Each MMPU will be fitted with an injection apparatus to inject the right additive, the payload process will amount to thorough mixing of the ingredient in the quantum, so the final product has all the additives in.

Non linear networks: The output from the piston-out may be divided between two or more outlets. Say the outlet piston is fitted with h holes divided to r groups, where group i (i=1, 2, . . . t) has $g_i$ holes, so that $\Sigma\, g_i$=h. Every group $g_i$ is physically connected to a receptacle $r_i$ which is positioned to accept quantum of fluid or a section thereto. At a given point the slider piston (with holes closed) is pushing fluid to the piston-out. The piston-out has all its holes closed except the. $g_i$ holes in group i. Therefore all the pushed out fluid is channeled to receptacle i. This can change at any stage and the fluid will continue to flow to some group j≠i.

The receptacle can be a synchronized MMPUb or a capacitor.

Similarly when a quantum of fluid is sucked into an MMP unit. That piston-in may be physically connected to r fluid sources which at any point may be open or closed. At a given point in time group i is the only one open. When the sliding piston is moving from the piston-in towards piston-out it sucks in fluid only from source i (the other sources are closed). Here too the source may be another MMP (synchronized) or a capacitor.

Networks may be closed loop (makes no much sense), and otherwise complex configuration with a single or more inlet and a single or more outlet.

The network operation will be controlled by the control system and operated by the power system.

As described several MMPU may converge on a single focal point, and also a single focal point may project into several MMPU. That is the essential structure of a network.

Power System

MMP units require power to move the pistons against resisting fluid. Less power for small units with say diluted gas as the quantum fluid, and more power when large and a viscous fluid needs to be forced to flow through the passage ways of the sliding piston.

The size determine the design of the power system. It may be a bit complicated but it is not new, the technology is well tested. The power may be engine source, power from the grid, or local power. There is ample industry experience in making well placed pistons move back and forth inside their track of motion.

Control System

The MMP unit is operated either on feed forward basis or on feedback basis. In the latter, real time measurements of the passing fluid will affect the control action. In the former the sequence of control is finalized before the operation begins and proceed through all its steps without the benefit of real time measurement input.

The control system changes the h+2 space point of the sliding piston to fit a desired pathway on the multi dimensional space. When networked the control of each MMPU is coordinated to serve the overall operational objective of the network.

Piston Construction

The piston itself is the central element in the MMP apparatus. It comprises a rigid surface fitted with means for motion along an axis perpendicular to that surface. In the surface there are h holes of various sizes, various shapes, which are configured in a non-overlapping way throughout the surface of the piston. Each of the h holes may be in a fully open state, in a fully closed state, and in any state in between. While the size and the configuration of the holes is fixed per piston, the open/close state of each hole is dynamic. The piston is handled by a control system that at any moment determines. (i) position along the axis of motion—perpendicular to the surface, (ii) rotation state, (iii) opening state of each of the h holes. The piston is handled by a power source to move it along its axis of motion, to rotate it around its axis of motion and to change the opening state of its h holes.

Holes Construction

The standard shape of holes is circular, but any shape is acceptable. The key parameter of the hole is its size. The second parameter is the depth of the hole, the third parameter is the direction of the hole.

A hole of opening size A and a depth d, will contain an amount of fluid $V_h$=Ad at any moment of the motion of the piston. The contact area of the in-hole fluid with the walls of the hole is $A_h$=cd, where c is the circumference of the hole. So for a circular hole of diameter d, we have A=0.25*$\pi$*($d^2$), and c=$\pi$*d, so $V_h$=0.25*$\pi$*($d^3$) and $A_h$=$\pi$*$d^2$. The ratio between $V_h$ and $A_h$ is especially important if the hole wall is used for a purpose. That purpose may be heat exchange or it may be for catalytic action, etc.

There are various established engineering solutions that can be applied for the purpose of creating a dynamic opening status for all the holes. A status to be readily controlled by the MMP controller. In most cases the status will be binary, open max, or closed shut, but integrin states are part of the action.

We discuss here to solution for hole status engineering: (i) rotating tongue, and (ii) piston pack.

Rotating Tongue

A piston hole of area size A will have a pivot point, pp somewhere near the edge of the hole. The pp will be the location where a 'tongue', T, is fitted with the freedom to rotate on its axis, parallel to the surface of the piston. The "tongue" is a rigid surface of size A'>A. where A'→A, namely the tongue is slightly larger than the hole, and assumes its shape. The tongue T may be placed in a complete overlapping state with the hole of size A, so that it block the hole and ensures a state of 'hole closed'. The tongue may rotate around the pp and be placed off the hole so that the hole is 100% open. The tongue may be rotated to a position over the hole so that a ratio, r (0≤r≤1) of the hole is open.

The tongue is fitted with a rotating box which accepts electrical energy and rotates the tongue around the pp to the desired state.

In order to protect the tongue, it is possible to construct the piston from two equal construction pistons that are put abreast each other except for an in between space where the tongue and its motion controller are placed. Thereby the tongue is protected between the two pistons parts.

Pistons Pack

This solution is based on packing two or more pistons that can independently rotate one against the other. The two pistons may be identical in terms of which holes, location, size and shape to drill in them. These pistons may be in a perfect overlap state and in that case the fluid next to the piston will see the h holes as all fully open, as if there was only one piston with its holes open. Alas, these two pistons may be shift rotated one against the other so that all the holes in each piston surface will see a blocked area in the opposite piston, which in practice means that all the holes in the piston are blocked. The relative rotation of the pistons against each other may be in such a state as to achieve any desired partial holes opening in the double piston pack. Similar control of opening state may be achieved with a pack of three or more pistons adjacent to each other. One notes that the relative rotational position of one piston parts against each other is independent of the combined rotation of all the parts of the pack around the axis of motion.

Complex MMPU

A complex MMPU (MMPUc) apparatus is one where between the two stationary pistons there are two or more sliding pistons where each piston is free to position itself between the former piston and the next piston, at any given moment.

A complex MMPU may serve as a series of basic MMP units where sliding pistons temporarily serve as stationary pistons. There might be an extra burden on the engineering of the independent movement of all the pistons sharing the same axis of motion.

A complex MMPU comprising c pistons is defined per its state as a point on a c (h+2) dimensions space.

Unit Operations

The MMPU will apply to the following Unit Operations:

1. heating/cooling and other non-contact influence 2. pumping 3. Mixing 4, Reacting 5. Separations.

Non Contact Influences

The MMPU operates for a given time period $\Delta T$ on a quantum of fluid captured in the container in which the multi mode pistons moves. While captured the quantum fluid may be subject to external influences like heating, cooling, radiation, and gravitation. One can design the MMPU such that the time the quantum fluid is captured in the MMP container is sufficient for the desired influence to be carried out. For example, a cooling system will require 2 minutes to bring down the quantum fluid temperature to a target low, so the MMPV will hold on to the quantum of fluid (QoF) for that 2 minutes so that when the fluid leaves the container to the next stage, or to a capacitor, it would be in the desired state.

Pumping

The MMP may be fitted in any fluid conduit, and operate as an internal pump. The piston will push fluid ahead while its fluid passageways (holes) are in a closed state, and then the MMP will retreat to its starting position while its holes are set to "open". From the starting position it will again push fluid forward. While the MMP pushes fluid forward it sucks in fluid from up stream the just sucked in fluid is pushed forward the next time around. This internal solution removes the need for an external pumping apparatus. The pumping MMP may be operated by a charging battery which in turn may be wirelessly charged, keeping the fluid moving in the conduit where the MMP is fitted.

Mixing

Mixing is the fundamental unit operation for the MMPU. The multi mode piston is traveling back and forth between two edges of a fluid container that contained the processed fluid. In doing so the piston exhibits an array of pathways, and is in a state of rotation that creates forced turbulence in the captured quantity of fluid, QoF. The degree of mixing is determined by the state of the multi mode piston in terms of passage opening and rotation and the number of rounds that the piston has been sliding back and forth between the container's edges.

Reactions

The MMPU will facilitate reactions in two modes? (i) liquid phase reactions, (ii) gaseous phase reaction, (iii) Gas-Liquid reactions, (iv) fluid-solid reactions.

The non-solid reactions are predicated on the high level controllable mixing effected by the MMPU.

The solid-involved reactions are facilitated on a basis of a forced fluid flow through the piston pathways. The involved solid may be in two setups: (i) wall plated, and (ii) flow through sieve. The MMPU effects a forced flow through the pathways thereby achieving dynamic contact with the inner walls of the holes drilled in the piston. This contact time can be used for a reaction between the plated material and the go through flow. Alternatively the solid walls may serve as a catalysator to accelerate a fluid phase reaction.

In the path through sieve, the liquid comes to more intensive contact with the material that constructs the sieve allowing for intensive interaction.

Separations

Separations by MMPU are (i) fluid phase, (ii) fluid-solid phase.

In the former the action is predicated on the mixing situations effected by the MMPU. It may be in a single phase mode or in a double phase mode. In the latter the separation is predicated on the forced flow of the fluid through the piston pathways. In that case separation may be accomplished through special coating of the pathways inner walls, or it may be accomplished through a pathway sieve constructed from a special solid material. In either of these cases the separation will happen owing to different affinity that ingredients in the fluid phase have towards the path-through special solid medium.

We describe the basic separation procedure over a basic MMPU, then discuss cascading, and finally talk about particular cases.

Construction

The Essential element of the MMP apparatus is the switchability from a nominal (blocked) piston, to a passage through piston, back and forth. This is accomplished by a piston apparatus that allows one to control passage backwards through the piston while the piston in moving forward. This apparatus may keep the piston blocked like a nominal case where all the fluid pushed forward by the piston is moving forward. Alternatively it may be set so that holes in the piston allow for passage of fluid in opposite direction to the movement of the piston. These holes may be engineered to achieve a desired effect over the fluid engaged by the piston. A piston control system (PCS) will adjust the state of the piston to be blocked or to be a particular format of fluid passage through the piston, such format may change as the piston moves, creating a series of states for the piston to be adjusted over time as needed. One way that such adjustment may take place is through a setup of two discs rotating one against the other. The discs optionally may share an axis that provides linear movement along its line. And as the two disc piston moves back and forth, the discs are rotated one against the other and effect the switchability of modes from nominal piston to various states of passage through piston.

The MMP is moving within a container that fits the contour of round discs, regarded as a cylinder.

In a simple application the MMP apparatus contains the MMP, its axis and its container. The container is fitted with one or more inlets and with one or more outlets. This is regarded as Base MMP apparatus. Base apparatuses may be connected through capacity containers to build a configuration of several base MMP for a given purpose.

The MMP operation may be constructed as a battery of such pistons fitted in given intervals on a single axis. We distinguish two options: (i) fixed interval MMP and (ii) dynamic interval MMP. In the former construction the MMPs are fitted along the axis are placed in a fixed distance one from the other. In the latter construction the MMPs enjoy relative motion option one against the other, so that the intervals between them and the intervals towards the sides of cylinders are dynamic and may change with the operation of the apparatus.

What is common to both construction is that the axis is housed in one container long enough to engulf all the MMPs that are fitted along the axis. The shape of the container fits the shape of the piston so that the piston can move inside the container with no margins of space between the piston and the container. Nominally the piston will be round and the container will be a cylinder, but it is not necessarily so.

Pair MMP

The Pair MMP construction is comprised of two pistons facing each other across a shared container. They are built to capture a quantum of fluid and push and the pull that quantum across a media that is fitted in the container such that the fluid (the payload fluid) can flow back and forth. The purpose of this unit is to engage the flowing fluid with the Flow Through Media (FTM) which is a solid or near solid, smooth, rugged or porous and where enhanced contact is desired between the FTM and the flow through media.

In the nominal applications the pistons will have only two states: open and closed. The capsule is fitted with at least one inlet and at least one outlet. One piston is fitted close to the inlet, the ipiston and the other is fitted close to the outlet, the opiston.

Operation

Three phases: (i) capture, (ii) engagement, (iii) discharge. A quantum of fluid is captured from the inlet into the MMP container where the media is fitted. The quantum is then engaged with the flow through media to achieve the objective of the engagement. When done, the quantum is drained out through the outlet, and the next quantum may be ushered in.

The capture happens when the ipiston is in closed state and moves from the inlet side of the container towards the location of the flow through media within the container. when the ipiston is abreast with the FTM the inlet valve is closed and the ipiston switches its state from closed to open. The ipiston moves from the FTM to the side of the container where the inlet is fitted. Being open the fluid formerly captured through the suction of the ipiston and houses from the inlet side to the FTM, is then flowing through the open holes of the ipiston as the ipiston moves to the inlet side. Now the engagement will proceed. The ipiston will revert to closed position. The opiston will be placed abreast of the FTM from its opposite side. The opiston will be in closed state. Then the two pistons will be moved in a coordinated way. The ipiston will move from the inlet side to the FTM and the opiston will move from the FTM to the outlet side. Both pistons being in a closed state will force the captured quantum of fluid to make its way across the flow through media until the ipiston is again abreast of the FTM and the opiston is abreast the outlet side of the container while the quantum of fluid is captured between the FTM and the opiston, namely the quantum of fluid in total passed through the FTM and engaged it.

The operation now continue in reverse, symmetrically. The pistons remain in closed states and both move in tandem so as to move the quantum of fluid back through the FTM to where it was when captured. The opiston moves from the outlet side of the container to the be breast of its side of the FTM, and the ipiston will move from the FTM to the container side fitted with the inlet.

These back and forth operation in which the quantum of fluid is forced one way and its reverse through the FTM may be repeated any desired times. When this engagement phase is concluded then the discharge phase begins. To do so the opiston while abreast with the outlet side of the container is switched to open state, while the ipiston now abreast of its side of the FTM, remains closed and does not move. The opiston now in the open position is moved from the outlet side of the container to the FTM. Since the ipiston is in closed state the quantum of fluid is forced to flow through the openings of the opiston to fill the cylinder in the space from the FTM to the outlet side of the container. When the opiston reaches the FTM from its side. it switches its state from open to closed. Then the outlet which was valve closed till now, is opened. The opiston is moved from the FTM to the outlet side of the container and by doing so it discharges the quantum of fluid from the container to the outlet. When the opiston reaches the outlet side of the container, the discharge is complete, and so is the sequence of the FTM engagement. The ipiston can now introduce a new quantum of fluid. Such a introduction can take place in parallel to the discharge of the former quantum of fluid because the opiston moves in a closed state.

This is the simple operation. There are variations, the quantum of fluid may be pushed in part through the FTM, then both pistons shift to the open state and move from where they are when the part of the quantum of fluid has been pushed through the FTM, and both pistons move towards each other until both are abreast of the FTM each from its own side. This movement forced the part of the fluid that passed through the FTM to be captured between the opiston and the outlet side of the container, while the part of the fluid that has not been pushed through the FTM is captured between the ipiston and the inlet side of the container. This will allow the two pistons to be put in closed state. The opiston will now move to discharge their captured part each to its outlet. The opiston will move from the FTM to the outlet side of the container and discharge the part of the fluid it captured through the outlet. The ipiston will move from its side of the FTM towards the inlet side. It can discharge its captured fluid (the part not engaged with the FTM) through the inlet which will be fitted with a special container to capture the discharged fluid. Alternatively the inlet side of the container will include another pipe fitting, used for discharging the fluid portion captured by the ipiston.

Battery MMP Lineup

Presenting a battery (or call it a train) of MMPs moving back and forth inside a shared container (a battery container, or a train container).

We distinguish between two types of trains:

1. a synchronous train 2. an asynchronous train

The first train has all the piston in the train moving in the same direction and the same speed.

Asynchronous MMP Train

An asynchronous MMP train is constructed as a sequence of n asynchronous MMPs fitted along an MMP cylinder, and (n−1) dividers MMPs placed each between two successive asynchronous MMPs. (note: we use the term cylinder for the MMP container although its face does not have to be a circle as in a nominal cylinder, rather any closed shape shared by the cylinder and the MMPs). The n asynchronous MMPs: $P_1$, $P_2$, . . . $P_n$ are fitted each into a section of cylinder respectively: $s_1$, $s_2$, . . . $s_n$, where $|s_i|=x_i$ represents the length of section i for i=1, 2, . . . n. The cylinder length L equal or larger than the sum of the sequential sections:

$$L \geq \sum x_i \text{ for } i = 1, 2, \ldots n$$

MMP i ($P_i$) is fitted to move in the cylinder in section $s_i$ back and forth, switching at will its flow state (open, closed, etc.).

Section $s_i$ may be constructed with injection facilities to introduce additional matter to the fluid contained in $s_i$, and also be constructed with attribute altering means to change the attributes of the fluid in $s_i$, for example, a heating or cooling facility to change the temperature of the fluid in $s_i$ to be of a desired value, or within a desired interval.

Piston $P_i$ will be moving from the beginning of section $s_i$ ($a_i$) to the end point of section $s_i$ (point $b_i$, where $x_i=b_i-a_i$), at a variable forward speed $Vf_i(t)$, then return in the opposite direction at a variable backwards speed $Vb_i(t)$, such that the piston will complete a full cycle through its section at time $t_i$ where:

$$t_i = x_i\left(1/Vf_i^* + 1/Vb_i^*\right)$$

where:

$$Vf_i^* = (1/x_i)\int Vf_i\, dx \text{ integrated from } a_i \text{ to } b_i$$

$$Vb_i^* = (1/x_i)\int Vb_i\, dx \text{ integrated from } a_i \text{ to } b_i$$

Each of the asynchronous MMP will complete a number of rounds (back and forth cycles) respectively: $q_1, q_2, \ldots q_n$, then remain idle for time interval $\theta_i$, following which the quantum fluid captured in each section will be ready to be discharged to the next section or in case where i=n discharged out of the MMP train. The values of $q_i$, $t_i$, $\theta_i$ will have to be adjusted to ensure:

$$q_i * t_i + \theta_i = q_j * t_j + \theta_j$$

for all i≠j, where i, j=1, 2, . . . n

Cardinal for the MMP train is the idea that there are n positive integers $q_1, q_2, \ldots q_n$ such that:

$$q_i * t_i = q_j * t_j$$

for all i, j=1, 2, . . . n.

Mechanical Implementations of Asynchronous MMP

Presenting the following solutions 1. concentric rods 2. side movers 3. a perpendicular train 4. Splitting train.

Concentric rods are lumped into the center of the cylinder where each rod is handling a different piston such that the rods move independently from each other.

Side movers are attachments to a piston that is fitted through the wall of the cylinder with facilitation for motion back and forth with proper sealing against fluid leakage.

A perpendicular train is a setup where the sections on the trains are aligned perpendicular to each other, to allow room for a regular piston rod to move the piston back and forth. The asynchronous pistons and the dividers pistons are slated at 45 degrees to the direction of piston movement in order to put the sections properly one next to the other.

A splitting train features a split leading from one section to two optional next sections. Each of these next sections can continue as a regular linear train to a point of another split to two options where each of the new splits can continue linear at will and then split again, and so on at will. This is useful to split processed content time and again to get separation of ingredients.

Splitting MMP Trains

A splitting train may be used per a regular choice to pass the content of one section to one of the two splits for one reason or another. Another use is in connection with a separation application. The fluid content of a given section in the train is separated to one part (forward in the section) reacher with component X over component Y of the quantum of fluid Q captured in that train section while the other part (in the rear part of the section in question) is richer in component Y over X. That divergence could have been effected through a separation flowthrough media fitted in the mM piston. One will then arrange for the content of the section in question to be pushed out in a laminar flow (no more mixing). The pushing out will be such that the first part (richer with X) will be routed to one split option, call it the x-split, and no sooner is the forward part of the content of the section in question (the one richer with X) pushed to the x-split, than the x-split entrance is blocked and the other split option, split-y which was closed hitherto, is now timely opened so that the rear part of the fluid previously captured in the section under consideration (the pre split section) is now being routed to the y-split. Separation achieved.

The volumes of the two parts $V_x$ and $V_y$ respectively are smaller than the volume of the fluid in the pre-split section, $V_0$. Accordingly the split sections may be smaller than the volume of the pre-split section. And for the next split the volume will further diminish in size.

We describe here an configuration in which the volume of the splits is the same or similar to the volume of the pre-split section. This solution is applicable also to a regular train, and it can be applied to work with a next section that is larger as desired relative to the previous section. The configuration is based on setting the stopping piston in a position designed to accept exactly the part of the previous section that is planned to be routed to this section.

More specifically. Let the pre-split section, section 0, containing volume $V_0=V_x+V_y$, where $V_x$ is placed forward in section 0 and part $V_y$ (richer in Y over X) is placed in the rear part of section 0. When section 0 finished to process $V_0$, it pushes it outside. This happens at time point $t_0$. At that time point the piston that serves as the inlet stop/go to section y is in the closed position and stays in place, at the entrance to section y, and the respective piston in split x is also set to the op closed position, but unlike the y-piston which remain it mobilized, the x-piston is receding so as to pull the discharged $V_x$ into section x. As a result $V_x$ is being pushed out from section 0 to section x. The receiving MM piston at section x is receding to accept $V_x$ into section x. The piston then stops inside section x at the point that will exactly accept the volume of $V_x$ into section x. when the x piston stops $V_x$ is completely housed in section x. At that point the x-piston changes from closed position to the open position Applications Presenting:

1. unit operations. 2. integrated operations

Unit Operations

Presenting:

1. pumping 2. mixing 3. separation 3. media engagement.

Flow-Through Media Engagement

The MMP apparatus can be used to engage a flow-through media, (FTM). Two opposing pistons first introduce a quantum of fluid around a bulk of flow through media, then alternatively push and pull the fluid across the FTM to establish the desired engagement between the FTM and the fluid (the payload fluid).

Presenting:

1. FTM-MMP procedure 2. FTM-MMP applications.

FTM-MMP Procedure 1. two MMP 2. payload fluid 3. apparatus container 4. flow through media Separation To carry out a separation between two constituents or groups of constituents in a body of fluid, the MMP unit will be operated so as to force the body of fluid to flow through holes in the multi-mode piston such that the passage of the fluid through the holes will result in part of the fluid richer in ingredient R and poorer in ingredient P (P and R may be groups of ingredients). The MMP unit will then be operated so as to separate the rich-part of the fluid from the poor-part of the fluid. This will amount to a step in the direction of the aim to separate ingredient R from P. The two separated parts—each a part of the original quantum of fluid, will be processed further as necessary to that the R-part of the fluid will be separated to R'>R poor and a part with less R-ingredient than R, and similarly with the P-part of the fluid, it will further undergo P-R separation as needed.

We describe here cascade operations options, and piston separation construction

Piston Separation Construction

To effect the separation the MM piston will have to affect the fluid while it passes through its fluid pass way (the holes). This impact on the fluid can be done through (i) hole linings, (ii) hole fitted sieve or membrane, (iii) piston induced radiation. For all these options a critical factor is the width of the piston, w versus the speed u assumed by the fluid as it flows through the piston pathway. The larger w the longer the fluid is in touch with the separation factor, and the lower the speed of fluid also the longer the fluid stays affected by the separation factor. For a circular hole of diameter d the volume of fluid that fits in a piston hole is $$v_p = 0.25d^2w$$

It take $t_p$ seconds for a given volume of fluid in a hole in a piston to leave the piston, where:

$$t_p = w/v_p$$

If there are n holes in the piston then the volume of fluid in all n holes at a given point is:

$$V_p = nv_p$$

The throughput of the piston is $$Q_p = V_p/t_p$$

When two MMP units, a and b are connected one feeds the other then their construction may differ in terms of the geometry and size of the pistons, but the throughput will have to agree:

$$Q_p(a) = Q_p(b).$$

Integrated Operations

The MMP apparatus is capable of a controlled operation over fluids, in a sequential way. It replaces pipes, vessels, faucets with compact geometrically versatile structure capable carrying out complex chemical processes in different scales, and in a compact fashion, where the entries MMPU sequence is enveloped and closed, fitted with a computerized control system, and activated via normal electrical power or other sources. The integrated MMP (IMMP) is designed for non expert operation involving hook up to raw materials and hook up to products, side product, and refuse. It can be turned on and allowing the iMMP control system to take over and get the process going.

Special size company iMMP will be used as travel companions in rough territory, in seafaring boats, and as personal processors at an intimate human scale, like personal dialysis kits, water or air purifier.

There is no limit to how large an iMMP can be. The iMMP may be made very small, the envelope of the MMPU may be made flexible, 3D compact and quite well packed for situations where size and compactness are of the highest importance.

We discuss (i) system structure of the iMMP, (ii) geometric flexibility.

iMMP System Structure

The iMMP is a compact box that includes a geometrically well planned network of basic or complex MMP units. It features:

1. standard inlet nozzles for raw material
2. standard outlet nozzles for main product, side product and refuse
3. Injection capsules
4. Control System for the iMMP
5. Power system
6. Environmental hook-up iMMP Geometric Flexibility Nominally the moving axis for the piston will be a rigid straight line, but it is not mandatory. The axis may be of flexible path followed by the tight engulfing envelope.

Nominally one piston will move on a straight line until it is abreast with the next or former piston. However this surface touch between two pistons may come to pass over a curved line, and allow the complex MMPU to stretch the next part of the envelope in a different direction than the former part. This flexibility will allow a long complex MMP or a combination of many basic MMPU to form an entangled or alternatively 'clean' geometric construction that lends itself to be fitted in an engulfing system box.

Chemical Engineering Integrator

Chemical Engineering today is largely immobile unstandardized. It requires skilled operators and complex maintenance. Here and there we see kits and prepacked chemical processors but they are not the norm. The multi mode piston apparatus may serve as a building block for chemical engineering integrator, assembling a sequence of chemical processes into a compact package that may be operated by unskilled operators. Computers and phones today are operated by the public without any in depth knowledge as to what happens inside the computing machine. Similar goal may be stated for chemical processes, especially those that bear an important social impact regarding health, the environment, etc. One may further envision integrator chemical engineering systems serving in remote area, on space travel, in colonizing the moon and then Mars.

The MMP is tight and closed. It is built from similar units multi-mode piston units that combined to move around fluid phase raw material to achieve mixing, reactions and separations, all in a network of these multi-mode piston units. A unified electrical power supply and a central control system is running and sequencing the operation in a black box mode so that the operator of the overall apparatus: the chemical engineering integrator, or Cintegrator for short has only to hook up the apparatus to raw materials, to main product, side product and refuse. The Cintegrator is designed to be mobile, to sustain sharp movements, and be friendly for voyages in rough territories and for operation in remote locations.

The control system is determining at each moment a digitized status of the cintegrator. There are n pistons in a given integrator, each piston can be set in one of x axial positions, rotate to one of $\omega$ rotational states, and each of its h holes can be set to one of g opening states. There are z injectors fitted onto the system. At each point of time each injector may be on or off, injecting a preset quantity of an addon to the piston-treated fluid in the surrounding pipe.

This amounts to the cintegrator at any moment being digitally defined through a tuple made of $\Omega$ states:

$$\Omega = .x * \omega * n * h * g * z$$

So set, the Cintegrator will be fit for supervised AI learning which will operate on same raw materials in order to identify an optimum sequence of parameters to achieve the desired product with minimum cost and minimum waste.

The Cintegrator may work on feedforward mode or on feedback mode.

Chemical engineering in large part is the technology for handling fluids—in touch with solids, but mostly in a single phase or multiple phase operation. From bird's view there are two categories of fluid operation: mixing fluids to create mixtures of to enable reactions, and separating fluids, to extract a desired product from other parts. It is the thesis of the Cintegrator approach that both mixing and separating fluids can efficiently done through a standard apparatus based on a set of coordinate multi-state pistons moving through a fluid container.

AI Ready Configuration

Control of an MMPU is readily digitized. The lateral position of the piston may be digitized to discrete intervals, as small as desired, same for the rotational states and the open/closed states of the pass ways. So a time dependent tuple defines the state of an MMPU in complete term and several tuples, or a combined tuple define the entire integrated operation built from MMP units. This digitization allows designers to design an initial setting, expressed as a series of time dependent tuples, and then apply live AI to improve upon it.

This can be done for a process that needs to produce an amount X of a given product. Instead of building a Cintegrator of capacity X, one build t Cintegrators each of capacity X/(t−2). These t cintegrators operating in parallel will generate more than X as their production capacity. Now one Cintegrator line can be slotted for routine maintenance, so a different Cintegrator line will be used each round, and the other Cintegrator line will be used to testing improvement and upgrades. The other (t−2) Cintegrator lines will pump out the product at the required rate. The control system for each integrator will operate the MMP units. They all start with the same operational strategy, reflected in the tuples, and then randomly some tuples will go random changes. The efficacy and the efficiency of each Cintegrator round is readily measured. Some are better than others. This is a data platform which is friendly to supervised AI to where a neural network or a similar technique is applied to the randomized mutations in the control strategy, thereby improving the efficiency of the process. Since raw materials and environmental conditions may change, so does the optimum and thereby the AI driven changes should be applied all the time that the process is active. The higher the value of t, the faster the AI optimization.

USE CASES

Medical Applications
Very Small Scale 3D Printed Integrated Chemical Engineering Unit Operations The full range of chemical engineering unit operations with respect to fluids is planned to be implemented as an integrated small scale construct. Pumping, catalysis, mixing, reacting, separating—a sequence of chemical processing put together in a tight small volume to create a maintenance free rechargeable battery-operated full-scale equivalent of industrial chemical engineering processes. Countless prospective applications, e.g. in-body dialysis, digestive de-toxification, enhanced blood flow.

Quantum Fluid Operation Language

A MMP unit may be in various states. A unit state is defined by the state of the inlet, the state of the outlet and the state of the moving piston. We depict for convenience a horizontal cylinder with the inlet depicted on the left size and the outlet depicted on the right side. We call them L and R respectively. L and R may be in a close state, marked as "x" or an open, flow state marked as "-". The piston P may be in a closed state marked as "0" or in one of its p positions, p different flow regimen: 1, 2, . . . p.

We say then that a MMP unit is defined by a three value tuple: U=(L, P, R). For example (-, 1, x) reads as a state where the left inlet is open and right outlet is close and the piston is in state 1.

Given a state U of an MMP unit, the piston P will be activated to move (a step S) from position begin, b to position end, e (end). Positions are measured from the left most side of the cylinder where it is x=0.0 to the right most side of the cylinder where we have x=1.0. so $0.0 \leq e, b \leq 1.0$ and $b \leq e$.

A step S is defined through the state of the MMP Unit U=(L, P, R) and the movement of the piston from beginning position, b, to end position e: S=U, b, e=(L, P, R) [b, e].

Given n MMP units in sequence where a quantum of fluid Q flows from one unit to the next, then the sequence of action on the successive Q quantities is defined through the series:

$$S_i = U_i, b_i, e_i = (L_i, P_i, R_i)[b_i, e_i]$$

for i=1, 2, . . . n

Each MMP units may undergo a step at any interval of time t=1, 2, . . . f. So to describe the activities of the n MMP units over f time intervals, we will record:

$$S_{ij} = U_{ij}, b_{ij}, e_{ij} = (L_{ij}, P_{ij}, R_{ij})[b_{ij}, e_{ij}]$$

for i=1, 2, . . . n and for j=1, 2, . . . f Recall that for the case b=e the piston does not move and no action is taken for that unit, The n Units may be threaded to different constellations that can be expressed in an n×n matrix with n columns and n rows representing the n MMP units. The matrix will be mostly 'zeroed out'. A 1 (not a zero) if found in cell (i,j) means that unit i discharges fluid to unit j.

This constellation matrix C together with the steps list, S define the overall activity of an integrated MMP system.

The Lego Vision

The globally popular construction game Lego represents the power of a simple well designed unit to combine into impressive structures. This is the vision the propels the Cintegrator design. The basic multi mode piston unit represents an effective building block to construct the full range of chemical engineering operations which has remained fundamentally unchanged for decades: stirred vessels, capacity tanks, pipelines, pumps, separation columns etc.

The basic MMPU as a building block is designed to treat one quantum fluid at a time and support mixing, reacting and separation. It is comprised of a capsule part where the quantum of fluid is held, and a moving piston with l lateral position, r rotational position, and g opening positions for each of its h holes. So that at any moment a MMPU with one piston is defined by gh+2 numbers. Each number is one out of $\Omega$=l rgh possibilities.

The basic MMPU is designed Lego-like to fit with other units, and construct a configuration that can support large variety of chemical processes. The MMP network (construction of basic MMPU) is centrally controlled through a certain control strategy. The network can be well packed and operated by unskilled operators.

To allow for the power of AI a given production capacity C can be generated by p identical production units where each production unit is generated C/p quantity of the product. One could then apply standard AI learning to this constellation, introduce randomized small changes to the control strategy and then applying neural network procedures to progress towards a more effective more optimized control routine.

For the Lego vision to come through it is important to design very efficient binding solutions to the basic MMP units, so that these units can be easily connected to form a working constellation.

The Lego Building Block

The Lego building block is the basic multi mode piston unit comprising:

1. a capsule 2. two stationary (edge) pistons 3. a moving multi mode piston

In the basic embodiment the capsule is a cylinder the two stationary edge pistons are the two edges that construct the cylinder into a capsule that can capture of a quantum of fluid. These edge-pistons have holes on their surface which may be fully open, fully closed or somewhere in between. Through these holes fluids enter and exit the capsule. The moving piston moves between the two edges, while rotating and changing the opening status of its fluid pass way holes. This multi mode piston unit, MMPU, the Lego building block has a power source to move, rotate and open/close the piston's pathways, and a controller to effect the changes in the moving piston as to lateral position in the capsule, as to rotational position in the capsule and as to the opening status of its fluid-pass ways holes.

The basic idea is that by moving the piston through these three dimensions of freedom (lateral, rotational, and opening status), the MMPU will be able to draw into the capsule any number of constituent fluids, capture the contents of the capsule (a quantum of fluids), treat the quantum of fluid per a well defined processing goal, and then dispose of the quantum of fluid into any number of outlets.

This unit can mix fluid parts to any degree desired, creating conditions for a desired reaction to occur, and it can be used to 'unmix', to discriminate between constituents the comprise the quantum of fluid and creates separable parts of the fluid that are richer with a given fluid constituent versus other separable parts of the fluid that poorer with that ingredient.

The effect of mixing is happening by the moving piston being moved from one edge to the other and back again any number of desired times. This lateral movement is accompanied by rotation of piston and changing of the open/closed status of its fluid pathways.

The effect of separation happens when the moving piston is moving through the fluid, forcing the fluid to path through prepared pathways in the piston where these pathways are fitted with elements that create a separation such that the fluid when it goes through the pass ways is being enriched in one constituent versus another. This discrimination is achieved either through a proper selection of the material that represents the inside walls of the pass ways be in a catalyst, or a reactive element, or through a media fitted into the pass way so that the fluid that goes through the pass way is experiencing a large touch time with the material of which this media is constructed.

This "Lego" unit, the MMPU may be fit with fasteners to attach each such unit to similar units, to form a sequence of processing, Lego like.

A Formal Summary of the Invention

1. This invention present a generic multi purpose fluid handling dynamic apparatus, multi-mode piston, MMP, built as a piston moving in direction perpendicular to its surface (lateral movement), the piston is of an arbitrary shape, it is constructed as an external ring that envelops an internal circular part of the piston, a 'disc pack'; the disc pack is independently rotating around the axis of the piston's motion. Alternatively, the piston is circular and without a ring, comprising only a disc pack. The rotating part of the piston is constructed with holes (fluid passageways) through its surface, where each hole can be of an arbitrary size and arbitrary location, and each hole may independently switch its state between fully open, partially open, and closed; and where at any moment in time the piston may be at a certain lateral position, a certain rotational state, and each of its holes is in a certain state in the open/closed range. Fluid that flows through the opened holes of the pistons is undergoing a desired process.

This piston is controlled by an MMP controller (MMPC) that determines the values of the degrees of freedom of the MMP: lateral position, L(t), rotational position, R(t), and open states, O(t) of its holes (fluid passageways) throughout a range of time t from a preset $T_{start}$ to a preset $T_{finish}$. The width of the MMP, w, is arbitrary, in certain embodiments the inner walls of the holes are lined up with fluid-impact media, FIM, that changes certain attributes of the passing fluid; the holes are either empty or stuffed with a fluid-impact porous media; fluid impact is exemplified by the following partial list: (i) catalysis of a chemical reaction within the fluid, (ii) reaction between the fluid and the fluid-impact media, (iii) separation between ingredients within the fluid.

2. The MMP in paragraph 1 where the piston is moved laterally with a rod perpendicular to its surface and where the rod is being moved along its axis through an external power source, and where the rod is rotated with an external power source, and this rotation rotates the piston attached to the rod.

3. The MMP in paragraph 1 where the holes are generated by either: (i) constructing the disc pack as a pack of adjacent discs with holes in them, where the discs rotate independently so that they are configured for (i.i) a state of no overlap between the holes of the discs, which is a state of "closed" for the piston, and where (i.ii) the discs are configured to create full overlap among the holes of the discs, which is the state of "fully open" for the piston, and where (i.iii) the discs are configured with a partial overlap among the holes of the discs which is the state of "partially open", and where the degree of the state of being open is determined by the degree of overlap among the discs of the pack. The adjacent discs receive rotation power by either one of the following ways: (i.a) each disc is attached to a rotating rod, where the rods of the adjacent discs are concentric, each with a different diameter, and each is rotated individually through a power source outside the MMP; (i.b) an internal battery which is charged either by wire or wirelessly; (ii) constructing the disc pack with a pivot next to each hole, the pivot secures a hole-shaped plate, a "rotating cover", that may be aligned with the hole and cover it completely, or may be rotated away from the hole and open it completely, or it may be placed to partially overlap the hole and keep it partially open, the rotating covers are powered by the internal battery.

4. The MMP in paragraph 3 where the discs are connected to concentric rods so that each concentric rod can be independently rotated in order to achieve the desired state of overlapping among the holes of the discs.

5. The MMP of paragraph 1 where next to each hole there is a pivot to which a "hole cover" is attached, where the hole cover is a rigid surface in the shape of the hole, and slightly larger so that the hole cover is rotating around the pivot to either cover the hole completely (a "closed" state), or completely not cover the hole (a fully open state), or rotate to a state of partial cover of the hole; and where the rotation of the cover is being taking place with electro-motoric means.

6. The MMP of paragraph I used to process a fluid kept in a container, where the MMP is immersed in the fluid and exercises lateral movements, rotations, and changes in the open/closed states of all the holes in the MMP, thereby affecting mixing and generating fluid-impact by forcing fluid to pass through the open holes of the piston where the holes that are open are different from moment to moment.

7. The MMP of paragraph 1 fitted inside a pipe or a tube and moving back and forth inside a section of the tube, and thereby pumping fluid inside the tube; the pumping is done through the following steps: (i) the MMP is put in a 'closed' position with respect to all its holes, (ii) the MMP is moved inside the tube in the direction of the pumping, from a starting position $P_{start}$ to an end position $P_{finish}$, thereby pushing forward the fluid ahead of it, and sucking towards it the fluid behind it, (iii) the MMP is switching to fully open states for all its holes (iv) the MMP is moving back from point $P_{finish}$ to point $P_{start}$, while the fluid ahead of it flows through its holes to behind the MMP; this sequence repeats for as long as it is desired to keep the pumping operation of the MMP.

8. Cancelled.

9. A fluid handling and processing unit, F-Unit, comprising a capsule of volume $V_c$, into which a quantum of fluid is pumped and enclosed; the quantum of fluid $Q_f$ is being processed by a processing apparatus inside the capsule, PAC, for a processing time T, the processing includes as necessary heat exchange, and injection of materials; when the processing is done, the quantum of fluid is pumped out of the capsule and subsequent quantum of fluid is sucked in, repeating the same operation for as long as new fluid is ready to be sucked into the emptied capsule, thereby processing fluid at a rate. $Q_f/(T+T_c)$ for $Q_f$ measured in mass and at a rate $V_f/(T+T_c)$ measured in volume throughput, where $V_f$ is the volume of the quantum of fluid, $T_c$ is the time to exchange one quantum of fluid with another.

10. The apparatus in paragraph 9 where the PAC is an MMP, and thereby designating the F-Unit as an MMP Unit, MMPU, where the MMP is of an arbitrary shape, and where the capsule is a cylinder fitting around the MMP, and where the MMP moves from one edge of the capsule to the other, back and forth, and while moving the disc pack is rotating and is changing its open/closed status with respect to all its holes, and where each edge is regarded as stationary MMP.

11. The MMP unit in paragraph 10 where the lateral movement of the MMP is powered by a rechargeable battery inside the MMP, where the battery is charged either through a wire or wirelessly, and where the battery moves the MMP laterally by any of the following power transmission options: (i) rolling at least one cogwheel fitted on the MMP in touch with a cogwheel rail attached to the capsule, (ii) rolling at least one wheel fitted on the MMP, building friction with the internal walls of the capsule to enable motion, (iii) pulling at least one chain that fits through the piston, and is fastened to the two edges of the capsule, the chain is fitted on a wheel inside the piston, the wheel is being rotated by the internal battery, and where the wheel is fitted with external protrusions that hold the links of the chain; the piston moves in the direction where the wheel allows a shorter span of the chain between the piston and an edge of the capsule and where MMP rotation is effected through rotating the disc pack, rotation is powered by the rechargeable battery; and where the open/closed states for the holes in the piston are effected through either: (a) a rechargeable battery that moves the hole covers around their pivot to open or closed state. or (b) through coordinated mutual rotations of the discs in the pack.

11. The MMP unit in paragraph 10 used for mixing the ingredients in a quantum of fluid, where mixing proceeds as follows: let the quantum of fluid be sucked in from the left circular edge of the cylinder, and be pumped out from the right circular edge of the cylinder, when the quantum of fluid is fully sucked into the capsule the following steps are carried out: (i) both edges (stationary MMPs) are set into "closed" state (ii) the moving MMP is positioned abreast of the right edge, is set to "open" state (iii) the moving MMP is moving right to left while rotating thereby mixing the quantum of fluid in the capsule. When the moving piston arrives at the left edge, it returns to the right edge, to finish one out of several cycles that are practiced until the quantum of fluid in the capsule is mixed to a desired degree; when the state of desired mixing has been achieved the moving piston is positioned abreast of the left edge of the cylinder, switches to fully closed state while the two stationary pistons (the edges of the capsule) switch to open state; the piston then moves to the right edge thereby pushing out the quantum of fluid inside the capsule, and sucking in a new quantum of fluid, to be mixed as the former one, so continuing as long as fluid is available as input.

12. The MMP unit in paragraph 11 used to achieve a chemical reaction within the fluid by applying any necessary heat-exchange apparatus around the capsule, and by injecting into the capsule any required additives, the movement back and forth of the MMP will continue until the desired reactions achieved their designated status.

13. The MMP unit in paragraph 12 used to achieve separation between two constituents A and B with a fluid, where the separation is effected through the fluid-impact media which discriminates between A and B, A being attracted to the fluid-impact media B being rejected by the fluid impact media, the moving MMP is creating a fluid flow in contact with the fluid-impact media such that fluid that emerged from behind the moving MMP is richer with constituent A and the fluid that is ahead of the moving MMP is richer with constituent B, thereby there exists a point X between the right edge of the capsule, $E_r$, and the left edge of the capsule $E_l$ where the fluid between the MMP and $E_l$ is richer with constituent A and the fluid between X and $E_r$ is richer with constituent B, the two parts of the quantum of fluid are then routed to different destinations where each part can separately undergo the same separation operation, this procedure is repeated an arbitrary number of times to achieve an arbitrary level of separation between constituents A and B; an arbitrary numbers of holes in the MMP is fitted with the fluid-impact media, (the fitted holes), and an arbitrary number f of holes in the MMP are free from the fluid-impact media, (the free holes) to generate the separation between constituent A and constituent B the MMP moves through quantum of fluid with the fitted holes open and the free holes closed; the separation happens when the two edges are in closed position and the moving MMP moves from $E_l$, towards the other edge, $E_r$, forcing the fluid to pass through the open fitted holes, so that at a certain point X between the edges a degree of separation is achieved, then the fitted holes are closed, and the free holes are opened; the MMP then reverses it motion, moving from point X to the $E_l$ until it is located abreast of $E_l$, at that point the part of the quantum fluid between $E_l$ and point X is richer with constituent A and the part of the quantum fluid between point X and $E_r$ is richer with constituent B, the MMP then is switching all its holes into a closed state and moves from $E_l$ towards point X, at the same time the holes in both edges are switched to open so that the movement of the MMP from $E_l$ to point X pushes the B enriched part of the quantum of fluid outside the capsule to a receptacle planned to collect the B enriched part of the quantum of fluid, $R_b$, at the same time a new quantum of fluid is sucked into the capsule through $E_l$, the part of the quantum of fluid captured between the MMP and $E_r$ is richer with constituent A; subsequently the MMP is moving from point X to $E_r$ to push the A-enriched part of the quantum of fluid to a receptacle planned to collect the A enriched part of the quantum of fluid, $R_a$. $R_a$ and $R_b$ are also MMP units where this same separation process will repeat itself; the described process can also begin with the MMP moving from $E_r$ to $E_l$.

14. The MMP unit of paragraph 11 where the MMP unit is used to separate a fluid Q comprising a more volatile component Q' and a less volatile component Q" to two parts one richer with Q' and the other richer with Q", the separation is achieved as follows: the MMP unit is set to a vertical position, then a quantity of Q in a liquid phase $Q_l$ is pumped though the bottom edge of the MMP unit so that it fills the MMP capsule up to a point x lower than the high end of the MMP unit, and where the MMP is positioned at point x such that the atmosphere is above it, and the a quantum of liquid $Q_l$ is below it, then the bottom edge of the MMP unit cylinder is put in a closed state while the moving MMP is also set to a closed state, then the moving MMP is rising and thereby generating vacuum below it which is filled with fluid Q in the gaseous phase, the more volatile component Q' is richer in the gaseous phase while the less volatile component Q" is richer in the liquid phase, when the MMP reaches the upper edge of the MMP unit, then the fluid below it is partly liquid Q/and partly in gaseous phase, $Q_g$, then the upper edge holes are set to close, the holes of the moving MMP are set to open and the moving MMP is moving down through the gaseous phase of Q, $Q_g$ until it touches the surface of the liquid phase of Q, $Q_l$, then the holes of the moving MMP are being put into the closed state, the holes on both edges of the cylinder are set to open and the moving MMP is rising towards the upper edge, this movement pumps the liquid phase $Q_g$ to a receptacle outside the MMP unit, while more liquid Q is feeding into the bottom of the MMP unit from a feed source, the moving MMP is then put again in closed state and the liquid below the piston is pushed down to point x, at which point the above distillation sequence is repeated.

15 A general purpose fluid handling system assembled from MMP units as building blocks into a combined fluid operating facility, MMPF, that applies a sequence of chemical engineering unit operations on a set of input raw materials, to generate a desired product, and dispose of parts of the raw materials that did not convert into the desired product; the MMPU are connected either directly or through capacity tanks, the MMPF is controlled from a central control station that activates and operates the MMPs to coordinate a desired production line for a fluid product, the MMPF is a linear connection of n MMP units, $U_1, U_2, \ldots U_n$, such that unit i feeds into unit (i+1) where i=1, 2, ... n−1, and where.

$$V_i(T_i + T_{resti}) = V_j(T_j + T_{restj})$$

where $V_k$ is the volume of the quantum fluid that is contained in unit k, $T_k$ is the time a quantum of fluid is being processed in unit k. and $T_{restk}$ is the time a quantum of fluid is resting in unit k, before or after its processing, where i,j,k=1, 2, . . . n, and where i≠j; and where the MMP units share a geometric direction, (linear setting) or the MMP units are set at an angle towards each other in which case the shared edge of two non linear MMP units will be of angular shape to ensure that fluid from a first MMP unit flows to the next in line MMP unit, and where the MMPF is set up such that an MMP unit, $U_f$ (the feeding unit) is feeding into t MMP division units where each of the input edges in the division units. $U_1, U_2, \ldots U_t$ has $h_i$ holes, where i=1, 2, . . . t and where the feeding unit has f=Σ $h_i$ holes, summarized over a subset Y of the division units, and where the feeding unit is feeding to the division units in the Y subset, the f holes in the feeding unit are open and the holes in the units of the Y subset are open, while the holes in the units which do not belong to the Y subset are set to a closed state, and the feed MMP is rotating so that the fluid contents of the feed MMP is divided between the divisions units of the Y subset, and where in a different network configuration the MMPF is set up such an MMP unit $U_c$, the collecting unit, is collecting fluids feeding from t' MMP feeding units where each of the output edges in the division units. $U_1, U_2, \ldots U_{t'}$ has $h'_i$ holes, where i=1, 2, . . . t' and where the collecting unit has $c = \Sigma\, h_i$ holes, summarized over a subset Y' of the feeding units, and where the collecting unit is being fed from the feeding units in the Y' set while the holes in the units which do not belong to the Y' subset are set to a closed state, and the collecting MMP is rotating so that the fluid contents of the collecting MMP is collected from the feeding units of the Y' subset.

16. A set of (g+2) MMPF as in paragraph 15 where each MMPF is designed for a capacity of Z=X/g where X is the target capacity (in weight units per hour), where g MMPF are kept in operation while one MMPF, in turn, undergoes routine maintenance, and one MMPF, in turn, is being upgraded, at any moment the g operating MMPF satisfy the production requirement X, and where initially all the MMPF operate according to a starting control strategy selected by its designers, and where the control attributes of each MMPF are subject to randomized slight changes, mutations, and where the process efficiencies of the mutationed g MMPF is evaluated, and is used as recurrent input into a standard supervised artificial intelligence, AI, neural network, or equivalent method of optimization, the maintenance-assigned MMPF and the upgrading-assigned MMPF are being changed to accommodate the optimization results of the AI inference; the AI optimization continues for as long as the set of MMPF is in operation, to keep the production optimized through unexpected operational changes.

Fluid Theoretical View

A body of fluid may be seen as a tight collection of 3D boxes. The fluid per box requires three degrees of motion freedom, plus internal flow control, plus external impact, like heat, additives and radiation. The MMPU is a singular unit providing three directions of motions: the piston back and forth is one, the piston rotation are two more. By controlling the states of the pass ways through the piston, and its rotation, the MMPU controls and changes from laminar flow to turbulent flow and vice versa. The MMPU offers a high ratio between contact surface outside the capsule and the quantum of the fluid inside the capsule, thereby making it efficient to apply heat exchange, to apply radiation, and to apply material injections. In summary the MMPU is consistent with theoretical analysis of how a generic chemical engineering processing unit should look like.

What is claimed is:

1. A multi-purpose fluid handling MMP apparatus, comprising a system of multi-mode pistons, (MMPs), each MMP designed as a building block for a complex industrial chemical processes involving fluids, built as a fluid container formed as a capsule which contains a quantum of one or more fluid ingredients and which is constructed with a fluid-entrance plate of an arbitrary shape, and a fluid-exit plate of the same arbitrary shape, where fluid enters into the capsule through the entrance-plate and leaves the capsule through the exit plate;

where the plates are placed at a perpendicular distance d one from the other, and where an envelope of the capsule separates the volume between the plates from the outside;

the capsule containing a piston moving inside the capsule between the entrance plate and the exit plate, such that the envelope fits smugly over the moving piston, which has a same shape as the plates, the piston configured for lateral movement from plate to plate;

the piston optionally being constructed as an external ring enveloping an internal circular part of the piston, in the shape of a disc, forming a 'disc unit' wherein the disc is independently rotating around the axis of the piston's lateral movement;

the disc and the two plates being constructed with holes forming fluid passageways through their surface, where each hole is of an arbitrary size and placed in an arbitrary location, and each hole is configured to be independently switched between a state of fully open, states of partially open, and a state of closed; and wherein at any moment in time the piston may be at a certain lateral position, a certain rotational state, and each of its holes is in a certain state in the open/closed range;

each piston being constructed such that when the holes in the plates are closed, and the holes in the piston are open then when the piston moves between the plates the fluid contained within the capsule is moving through holes of the piston;

and such that as the fluid that flows through the opened holes of the piston is undergoing a specified process it gains momentum in the direction opposite the motion of the piston, and it interacts with the inner surface of the hole through which it flows;

the apparatus also comprising an MMP controller such that the pistons are controlled by an MMP controller (MMPC) that, such that for each piston the controller:

moves the piston to a lateral position L(t) at time point, t, across the distance d between the plates, rotates the piston to a rotational position, R(t), and wherein the controller determines the open/closed status of each of its h holes: $O_1(t), O_2(t), \ldots O_n(Q)$, on the piston and the plates, where the piston moves throughout a range of time from a preset $T_{start}$ to a preset $T_{finish}$, $$T_{start} \le t \le T_{finish}:$$

the width of the MMP, w, being arbitrary, wherein optionally the inner walls of the holes are lined up with fluid-impact media, (FIM), that changes certain attributes of the passing fluid and the holes are either empty or stuffed with a fluid-impact porous (FIP) media;

the MMP being operable for performing (i) catalysis of a chemical reaction within the fluid, (ii) reaction between the fluid and the fluid-impact media, and (iii) separation between ingredients within the fluid;

the MMP pistons being combined so that fluid emerging from one MMP piston flows as input to the next MMP piston, or to a plurality of MMP pistons, which further feed fluid to receiving MMP pistons, iteratively, to carry out an industrial chemical fluid handling process to produce one or more final products from raw materials, the MMP pistons being centrally controlled to optimize the industrial chemical process as a whole.

2. The MMP apparatus of claim 1, wherein for each piston, the holes are constructed by either:

(i) constructing a disc pack as a collection of two or more adjacent discs with holes in them, where the discs rotate independently so that they are configured for (i.i) a state of no overlap between the holes of the discs, which is a state of "closed" for the piston, and wherein (i.ii) the discs are configured to create full overlap among the holes of the discs, which is the state of "fully open" for the piston, and wherein (i.iii) the discs are configured with a partial overlap among the holes of the discs which is the state of "partially open", and where the degree of the state of being open is determined by the degree of overlap among the discs of the pack; and, the adjacent discs receive rotation power by either one of the following ways:

(i.a) each disc is attached to a rotating rod, where the rods of the adjacent discs are concentric, each with a different diameter, and each is rotated individually through a power source outside the MMP;

(i.b) an internal battery which is charged either by wire or wirelessly; or (ii) constructing the piston with a pivot next to each hole, wherein the pivot secures a hole-shaped cover plate, that in one state is aligned with the hole and covers it completely, and in another state rotates away from the hole and opens it either completely, or partially overlapping, wherein the cover plates are powered by an internal battery.

3. The MMP apparatus of claim 2, wherein for each piston, the discs are connected to concentric rods so that each concentric rod can be independently rotated in order to achieve a desired state of overlapping among the holes of the discs.

4. The MMP apparatus of claim 1, wherein the apparatus is configured to achieve a specified degree of mixing of the fluid ingredients that are placed in the capsule, wherein for each piston, the MMP is moving an arbitrary number of times back and forth between the entrance plate and the exit plate, carrying out lateral movement, superimposed by;

(i) arbitrary rotational movement of the piston, and by (i) arbitrary states of open/close of the piston holes of the MMP while the MMP is being rotated while the holes in both plates are kept closed; and (iii) forcing the fluid ingredients in the capsule to pass through the open holes of the piston for a time t, where the positions of these holes in the capsule is determined by the state of the piston at a time point $t_p$, with regard to a lateral position, L(t), and with regard to a rotational position, R(t), for $$T_{start} \le t \le T_{finish}.$$

5. The MMP apparatus of claim 4, wherein the apparatus is configured to achieve a specified degree of mixing of the fluid ingredients in the capsule, while pumping a new quantum of fluid ingredients into the capsule, and pumping out the mixed fluid from the capsule;

wherein the enclosure is part of a pipe or a tube and the piston is moving back and forth between the entrance plate and the exit plate, pumping fluid inside the pipe or the tube, and the pumping is done through the following steps:

(i) starting state:

the enclosure is filled with fluid ingredient, the piston is adjacent to the exit-plate;

one or more of the holes in the piston are in an open or partially open state; and, the holes in the entrance-plate and in the exit-plate are placed in 'closed' state;

(ii) the piston is moved from the exit plate to the entrance plate, forcing ingredients of fluid in the capsule to flow through the one or more open holes in the piston; thereby mixing the fluid ingredients in the capsule, in a "mixing motion";

the mixing motion is controlled by the MMPC, determining at each moment t where $T_{start} \le T_{finish}$, the lateral position L(t) of the piston, its rotational position R(t), and the open/closed state of the holes of the piston;

(iii) if the specified degree of mixing is achieved then step (v) is taken, otherwise;

(iv) while the holes in the entrance plate and exit plate remain closed, and at least one of the holes in the piston is kept partially open, the piston moves from the entrance plate to the exit plate, and then returns to the entrance plate;

if the specified degree of mixing has been achieved then step (v) is taken, otherwise step (iv) is being repeated;

(v) when mixing is complete, the mixed fluid captured in the capsule is being pumped through the exit plate and a new quantum of fluid is sucked into the capsule through the entrance plate, wherein: the holes in the piston disc are put in 'closed' state, the holes in the entrance plate are put in 'open state', the holes in the exit plate are put in 'open state', and the piston is moved from the entrance-plate to the exit plate, wherein if the fluid in the capsule contains only a single ingredient then this procedure effects only mixing.

6. The MMP apparatus of claim 1, wherein for each piston, the capsule is of volume $V_c$, and into which a quantum of fluid is being pumped and enclosed; the quantum of fluid $Q_f$ is being processed by an add-on processing apparatus inside the capsule, (PAC), for a processing time T, and the processing optionally includes heat exchange, and injection of materials; and, when the processing is done, the quantum of fluid is pumped out of the capsule and a subsequent quantum of fluid is sucked in, repeating the same operation for as long as new fluid is ready to be sucked into the emptied capsule, thereby processing fluid at a rate $Q_f/(T+T_c)$ for $Q_f$ measured and at a rate $V_f/(T+T_c)$ measured in volume throughput, where $V_f$ is the volume of the quantum of fluid, and $T_c$ is the time to exchange one quantum of fluid with another.

7. The apparatus of claim 6 wherein for each piston, the MMP is of an arbitrary shape, and comprises a disc pack, and wherein the capsule is a cylinder fitting around the MMP, and wherein the MMP moves from one edge of the capsule to another, back and forth, and while the disc pack is rotating and is changing its open/closed status with respect to all its holes each edge is stationary.

8. The MMP apparatus of claim 7, wherein for each piston, the lateral movement of the MMP is powered by a rechargeable battery inside the MMP apparatus, where the battery is charged either through a wire or wirelessly, and where the battery moves the MMP laterally by any of the following power transmission options:

(i) rolling at least one cogwheel fitted on the MMP in touch with a cogwheel rail attached to the capsule, (ii) rolling at least one wheel fitted on the MMP, building friction with the internal walls of the capsule to enable motion, or (iii) pulling at least one chain that fits through the piston, and is fastened to the two edges of the capsule, wherein for each of the at least one chain, the chain is fitted on a wheel inside the piston, the wheel is being rotated by the internal battery, and the wheel is fitted with external protrusions that hold the links of the chain; so that the piston moves in a direction where the wheel allows a shorter span of the chain between the piston and an edge of the capsule, and wherein MMP rotation is effected through rotating the disc pack, rotation powered by the rechargeable battery;

and where the open/closed states for the holes in the piston are effected through either:

(a) a rechargeable battery that moves the hole covers around their pivot to open or closed state or (b) through coordinated mutual rotations of the discs in the pack.

9. The MMP apparatus of claim 8, wherein the apparatus is configured to achieve a chemical reaction within the fluid and optionally by applying heat-exchange apparatus around the capsule, and by optionally injecting into the capsule one or more additives, the movement back and forth of the MMP continuing until the reactions has achieved a designated status.

10. The MMP apparatus of claim 8, wherein the apparatus is configured to achieve separation between two constituents A and B within a fluid, where the separation is effected through the fluid-impact media in the apparatus which discriminates between A and B, A being attracted to the fluid-impact media B being rejected by the fluid impact media, the moving MMP is creating a fluid flow in contact with the fluid-impact media such that fluid emerging from behind the moving MMP is richer with constituent A and fluid that is ahead of the moving MMP is richer with constituent B, thereby there exists a point X between the right edge of the capsule, $E_r$, and the left edge of the capsule $E_l$ where a first part of the fluid between the MMP and $E_l$ is richer with constituent A and a second part of the fluid between X and $E_r$ is richer with constituent B, the two parts of the of fluid then routed to different destinations where each part can separately undergo a same separation operation, the separation repeated an arbitrary number of times to achieve an arbitrary level of separation between constituents A and B;

wherein an arbitrary number s of holes in the MMP is fitted with the fluid-impact media, (fitted holes), and an arbitrary number f of holes in the MMP are free from the fluid-impact media, (free holes) to generate the separation between constituent A and constituent B as the MMP moves through the quantum of fluid with the fitted holes open and the free holes closed;

the separation occurring when the two edges are in closed position and the moving MMP moves from $E_l$, towards the other edge, $E_r$, forcing the fluid to pass through the open fitted holes, so that at a certain point X between the edges a degree of separation is achieved, and the apparatus being configured so that for each piston when then the fitted holes are closed, and the free holes are opened; the MMP then reverses it motion, moving from point X to the E; until it is located abreast of E; at that point the part of the quantum fluid between E; and point X is richer with constituent A and the part of the quantum fluid between point X and E; is richer with constituent B, the MMP then is switching all its holes into a closed state and moves from E; towards point X, at the same time the holes in both edges are switched to open so that the movement of the MMP from $E_l$ to point X pushes the B enriched part of the quantum of fluid outside the capsule to a receptacle planned to collect the B enriched part of the quantum of fluid, $R_b$, at the same time a new quantum of fluid is sucked into the capsule through $E_l$, the part of the quantum of fluid captured between the MMP and $E_r$ is richer with constituent A;

subsequently the MMP is moving from point X to $E_r$ to push the A-enriched part of the quantum of fluid to a receptacle planned to collect the A-enriched part of the quantum of fluid, $R_a$, $R_a$ and $R_b$ being collected in MMP units.

11. The MMP apparatus of claim 8 wherein the apparatus is configured such that for the each piston, the MMP is a unit used in a distillation sequence to separate a fluid Q comprising a more volatile component Q' and a less volatile component Q" to two parts one richer with Q' and the other richer with Q", and further comprising a pump associated with each piston such that the separation is achievable by process steps conducted in each piston follows:

the MMP unit is set to a vertical position, then a quantity of Q in a liquid phase $Q_l$ is pumped though the bottom edge of the MMP unit so that it fills the MMP capsule up to a point x lower than the high end of the MMP unit, and where the MMP is positioned at point x such that the atmosphere is above it, and a quantum of liquid $Q_l$ is below it, then a bottom edge of the MMP unit is put in a closed state while being caused to move, so that fluid in the moving MMP is rising and thereby generating vacuum below it which is filled with fluid Q in the gaseous phase, the more volatile component Q' is richer in the gaseous phase while the less volatile component Q" is richer in the liquid phase, and so that when the MMP reaches the upper edge of the MMP unit, then the fluid below it is partly liquid $Q_l$ and partly in gaseous phase, $Q_g$, then the upper edge holes are set to close, the holes of the moving MMP are set to open and the moving MMP is moving down through a gaseous phase of Qs until it touches the surface of a liquid phase of $Q_l$, then the holes of the moving MMP are being put into the closed state, the holes on both edges of the cylinder are set to open and the moving MMP is rising towards the upper edge, and this movement pumps the liquid phase $Q_l$ to a receptacle outside the MMP unit, while more liquid Q is feeding into the bottom of the MMP unit from a feed source, and the moving MMP is then put again in closed state and liquid below the piston is pushed down to point x, at which point the above distillation sequence is repeated.

12. The MMP apparatus of claim 11, designed to form a set of (g+2) MMPFs from the system of multi-mode pistons each piston constructed as an MMPF, where each MMPF is designed for a capacity of Z=X/g where X is the target capacity (in weight units per hour), where g MMPF are kept in operation while one MMPF, in turn, undergoes routine maintenance, and one MMPF, in turn, is being upgraded, such that at any moment the g operating MMPF satisfy the production requirement X, and where initially all the MMPF operate according to a starting, selected control strategy, and where the control attributes of each MMPF are subject to randomized mutations and where each MMPF is configured such that process efficiencies of the mutated g MMPFs can be evaluated, and used as recurrent input into a standard supervised artificial intelligence, or neural network method of optimization so that the optimization continues for as long as the set of MMPFs is in operation, to keep the industrial chemical process optimized through operation of the MMP apparatus.

* * * * *